(12) United States Patent
Armbrust et al.

(10) Patent No.: US 11,592,815 B2
(45) Date of Patent: Feb. 28, 2023

(54) AUTONOMOUS UTILITY CART AND ROBOTIC CART PLATFORM

(71) Applicants: Daniel Paul Armbrust, Mequon, WI (US); Robert James Grabon, Cedarburg, WI (US); Radoslaw Adam Jarema, Cracow (PL)

(72) Inventors: Daniel Paul Armbrust, Mequon, WI (US); Robert James Grabon, Cedarburg, WI (US); Radoslaw Adam Jarema, Cracow (PL)

(73) Assignee: MuL Technologies, LLC, Mequon, WI (US)

( * ) Notice: Subject to any disclaimer, the term of this patent is extended or adjusted under 35 U.S.C. 154(b) by 433 days.

(21) Appl. No.: 16/807,032

(22) Filed: Mar. 2, 2020

(65) Prior Publication Data

US 2020/0401133 A1   Dec. 24, 2020

Related U.S. Application Data

(60) Provisional application No. 62/921,504, filed on Jun. 24, 2019.

(51) Int. Cl.
*G05D 1/00* (2006.01)
*B62B 5/00* (2006.01)
(Continued)

(52) U.S. Cl.
CPC .......... *G05D 1/0061* (2013.01); *B60W 50/14* (2013.01); *B60W 60/0011* (2020.02);
(Continued)

(58) Field of Classification Search
CPC .. G05D 1/0061; G05D 1/0214; G05D 1/0231; G05D 2201/0216; B60W 50/14;
(Continued)

(56) References Cited

U.S. PATENT DOCUMENTS 7,100,725 B2   9/2006   Thorne
7,431,115 B2   10/2008   Thorne
(Continued)

OTHER PUBLICATIONS

The Robot Report article & cart photo re autonomous robots, Eugene Demaitre, Apr. 11, 2019, therobotreport.com/amazon-acquires-canvas-technology-for-safe-mobile-robot-navigation/.

(Continued)

*Primary Examiner* — Rodney A Butler
(74) *Attorney, Agent, or Firm* — Jeffrey S. Sokol

(57) ABSTRACT

A robotic cart platform with a navigation and movement system that integrates into a conventional utility cart to provide both manual and autonomous modes of operation. The platform includes a drive unit with drive wheels replacing the front wheels of the cart. The drive unit has motors, encoders, a processor and a microcontroller. The system has a work environment mapping sensor and a cabled array of proximity and weight sensors, lights, control panel, battery and on/off, "GO" and emergency stop buttons secured throughout the cart. The encoders obtain drive shaft rotation data that the microcontroller periodically sends to the processor. When in autonomous mode, the system provides navigation, movement and location tracking with or without wireless connection to a server. Stored destinations are set using its location tracking to autonomously navigate the cart. When in manual mode, battery power is off, and back-up power is supplied to the encoders and microcontroller, which continue to obtain shaft rotation data. When in autonomous mode, the shaft rotation data obtained during manual mode is used to determine the present cart location.

38 Claims, 18 Drawing Sheets

(51) Int. Cl.
*G05D 1/02* (2020.01)
*B60W 50/14* (2020.01)
*B62B 3/00* (2006.01)
*B60W 60/00* (2020.01)

(52) U.S. Cl.
CPC .......... *B60W 60/0053* (2020.02); *B62B 3/00* (2013.01); *B62B 5/0043* (2013.01); *B62B 5/0053* (2013.01); *B62B 5/0069* (2013.01); *G05D 1/0214* (2013.01); *G05D 1/0231* (2013.01); *B60W 2050/146* (2013.01); *B60W 2300/40* (2013.01); *B60W 2420/10* (2013.01); *B60W 2420/22* (2013.01); *B60W 2420/52* (2013.01); *B60W 2530/10* (2013.01); *G05D 2201/0216* (2013.01)

(58) Field of Classification Search
CPC ......... B60W 60/0011; B60W 60/0053; B60W 2050/146; B60W 2300/40; B60W 2420/10; B60W 2420/22; B60W 2420/52; B60W 2530/10; B60W 2420/00; B62B 3/00; B62B 5/0043; B62B 5/0053; B62B 5/0069; B62B 5/005; B62B 2203/50
See application file for complete search history.

(56) References Cited

U.S. PATENT DOCUMENTS

| | | | |
|---|---|---|---|
| D618,418 S | 6/2010 | Catron | |
| D618,419 S | 6/2010 | Catron | |
| 7,920,962 B2 | 4/2011 | D'Andrea | |
| 8,204,624 B2 | 6/2012 | Zini | |
| 8,265,873 B2 | 9/2012 | D'Andrea | |
| 8,280,547 B2 | 10/2012 | D'Andrea | |
| 9,223,313 B2 | 12/2015 | Wolfe | |
| 9,563,206 B2 | 2/2017 | Zini | |
| 9,606,544 B2 | 3/2017 | Gariepy | |
| 9,679,270 B2 | 6/2017 | Zini | |
| 9,731,896 B2 | 8/2017 | Elazary | |
| D798,018 S | 9/2017 | Walter | |
| D812,663 S | 3/2018 | Waters | |
| 9,908,239 B1 | 3/2018 | O'Brien | |
| 10,019,015 B2 | 7/2018 | Johnson | |
| D826,508 S | 8/2018 | Cacioppo | |
| 10,216,193 B2 | 2/2019 | Gupta | |
| 10,294,028 B2 | 5/2019 | Hamilton | |
| 10,317,893 B2 | 6/2019 | Zou | |
| D855,275 S | 7/2019 | Walter | |
| 10,377,403 B2 | 8/2019 | Lee | |
| 10,423,150 B2 | 9/2019 | Wise | |
| 10,481,612 B2 | 11/2019 | Gupta | |
| 2002/0156556 A1 | 10/2002 | Ruffner | |
| 2004/0093116 A1 | 5/2004 | Mountz | |
| 2010/0168934 A1 | 7/2010 | Ball | |
| 2012/0303202 A1 | 11/2012 | Durkos | |
| 2013/0292925 A1 | 11/2013 | Shindelar | |
| 2017/0203778 A1* | 7/2017 | Jackson | B62B 5/0036 |
| 2019/0179329 A1 | 6/2019 | Keivan et al. | |

OTHER PUBLICATIONS

6 River Systems YouTube printout and cart photo re CHUCK autonomous vehicle, dated Apr. 17, 2018, https://www.youtube.com/watch?v=HpheerwkHg8.
MiR YouTube printout and cart photo re mobile industrial robots, dated Sep. 21, 2017, https://www.youtube.com/watch?v=0IFP8M1BRPg.
Amazon Robotic (formerly KIVA Systems) YouTube printout and photo re warehouse automation robots, dated Aug. 4, 2010, https://www.youtube.com/watch?v=3UxZDJ1HiPE.
Aethon YouTube printout and photo re TUG robot, dated Aug. 30, 2017, https://www.youtube.com/watch?v=MLZMAW9lqXE.
Clearpath Robotics YouTube printout re manipulatable mobile robot, dated Aug. 10, 2018, https://www.youtube.com/watch?v=7ZHb6HXX5yl&list=PL4wm67wcDRU32VUBYaaqm01SB5Klqj1&Index=2.
Fetch Robotics YouTube printout and photo re mobile warehouse robot, dated Apr. 18, 2018, https://www.youtube.com/watch?v=KyH3xXiqbUk.
GreyOrange YouTube printout and photo re BUTLER warehouse robots, dated May 7, 2018, https://www.youtube com/watch?v=B5-FEnXKdco.
Invia Robotics YouTube printout and photo re warehouse robots, date Sep. 17, 2018, https///www.youtube.com/watch?v=1stl-UBtGO4, website printout https://www.inviarobotics.com/.
Locus Robotics YouTube printout and photo re warehouse robots, dated Apr. 10, 2018, https://www.youtube.com/watch?v=2_l9j~1QJKU.

* cited by examiner

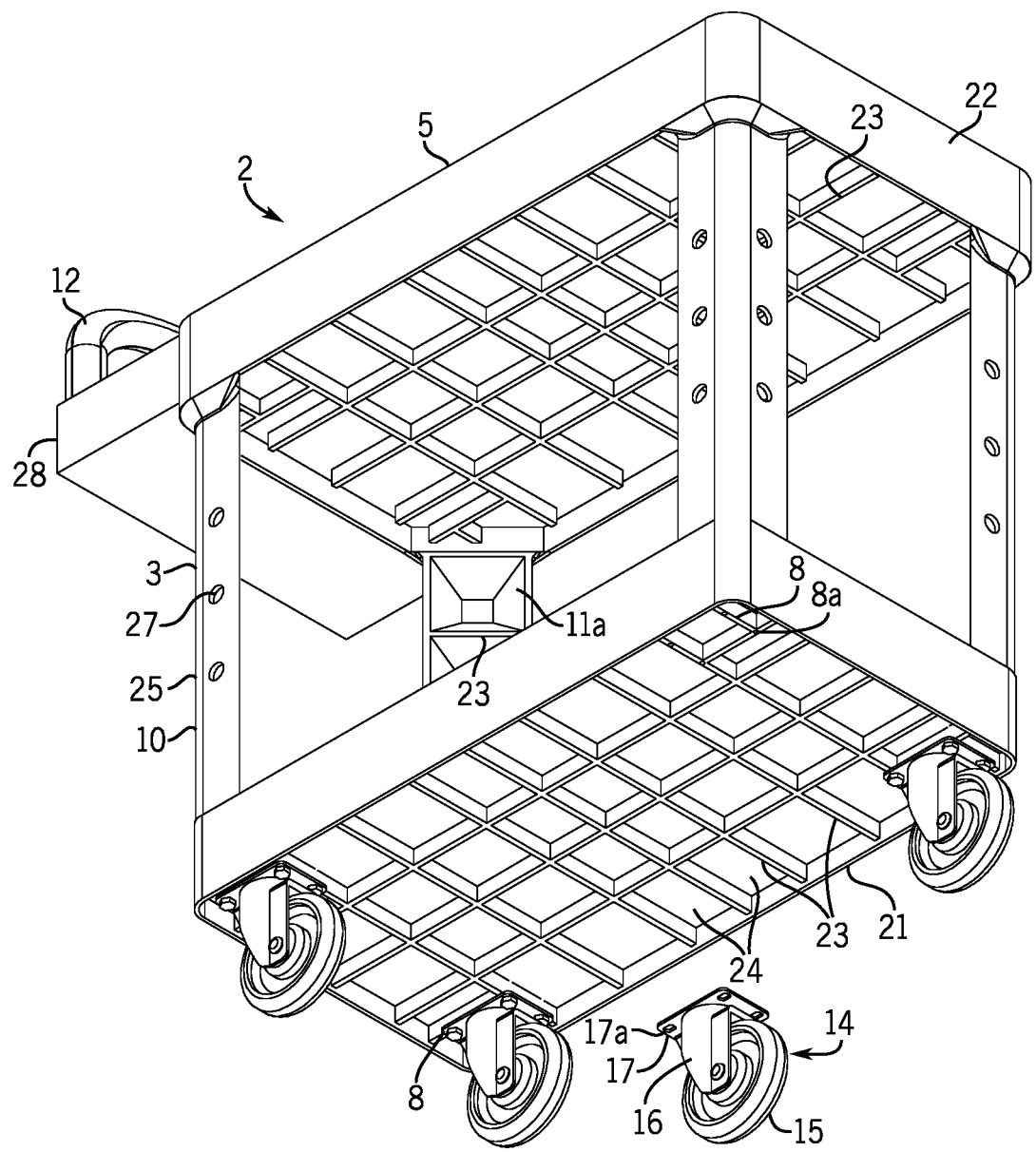
FIG. 1B
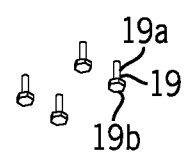

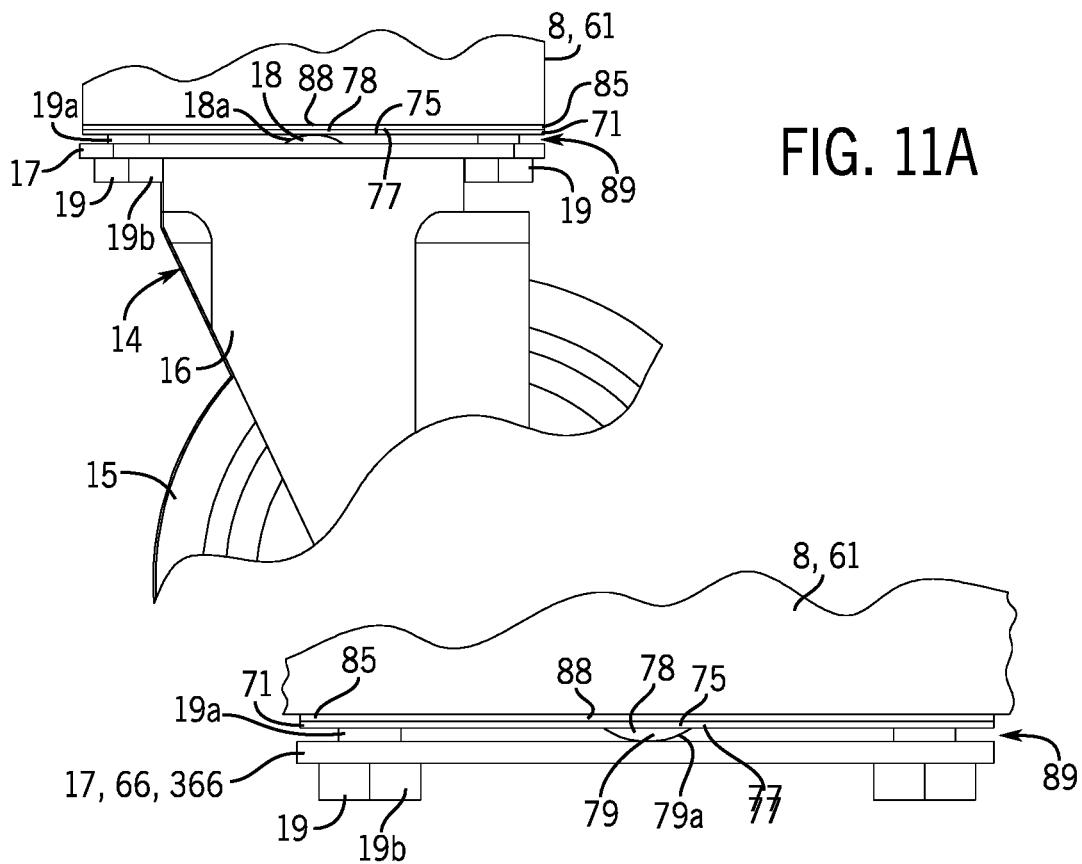
FIG. 11A
FIG. 11B
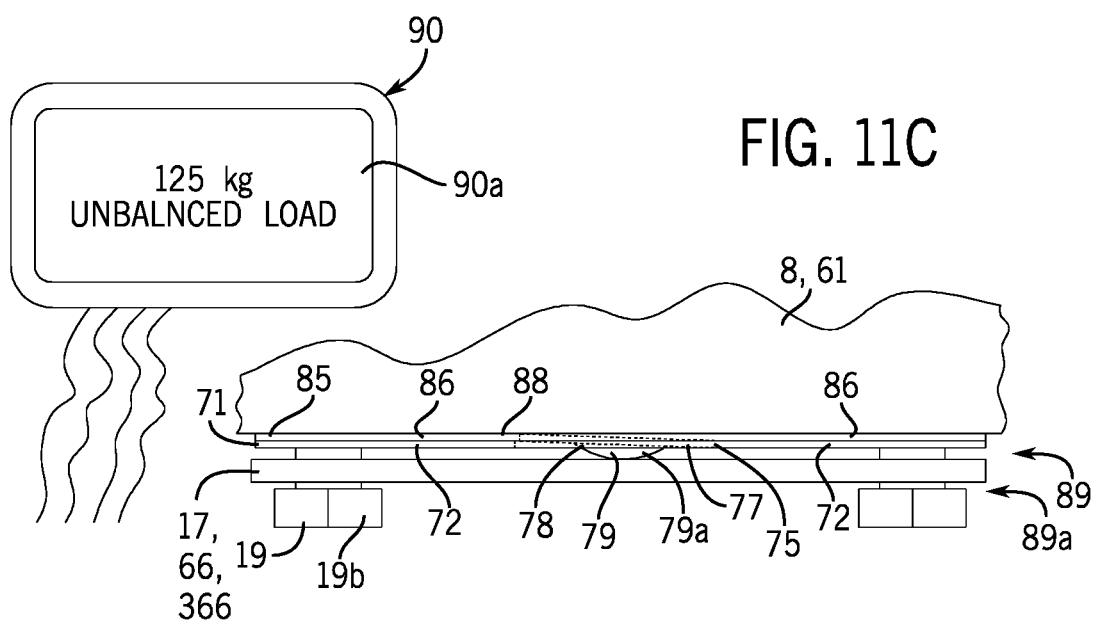
FIG. 11C

AUTONOMOUS UTILITY CART AND ROBOTIC CART PLATFORM

TECHNICAL FIELD OF THE INVENTION

This invention relates to a robotic cart platform that converts a conventional manually pushed utility cart into an autonomous utility cart with manual and autonomous modes of operation, tracks the movements of the cart in both modes of operation, warns when unsafe loading conditions occur and is operable with or without a wireless communication system.

BACKGROUND OF THE INVENTION

A wide variety of businesses rely on utility carts to move items around inside their buildings. The carts hold and transport tools, equipment, component parts and completed products, many of which are heavy, bulky or awkward to carry, and often include associated paperwork that needs to be kept with an item as it moves from station to station or room to room. The carts come in a wide variety of shapes, sizes and styles. The corners of the carts typically include vertical risers and multiple horizontal trays. The carts are typically made of plastic or metal, and their front and rear corners are typically supported by caster wheels. Plastic carts often have trays and risers made of molded foam plastic. Metal carts frequently have metal tubes for risers and meshed wire baskets for trays. Some carts have metal tube risers and reinforced plastic trays. The utility carts are often rated for 200 lbs to 500 lbs load capacities. Examples of these utility carts are made by Rubbermaid Commercial Products, LLC of Winchester, Va. and sold as Uline Model Nos. H-1053, H-2470, H-2471, H-2475 and H-2505, AMSA, Inc. of Boulder, Colo. and sold as Uline Model Nos. H2505 and H7435, and Suncast Technologies, LLC of Palm Beach Gardens, Fla. and sold as Model No. PUCPN1937. These and other utility carts are shown and described in U.S. Pat. Nos. D618,418 and D618,419 to Cotron, U.S. Pat. Nos. D798,018 and D855,275 to Walter and U.S. Pat. No. 10,377,403 to Lee, the contents of which are incorporated by reference.

Autonomous mobile robots for manufacturing, warehouse and distribution applications are well known. Examples include 6 River Systems' CHUCK robot and U.S. Pat. Nos. 10,294,028 and D826,508, Amazon Robotics' MARTI robot and U.S. Pat. Nos. 7,920,962, 8,280,547, 8,265,873 and 10,317,893, Aethon's TUG robot and U.S. Pat. Nos. 7,100,725, 7,431,115, 8,204,624, 9,223,313, 9,563,206 and 9,679,270, GreyOrange's BUTLER robot and U.S. Pat. Nos. 10,216,193 and 10,481,612, Clearpath Robotic's manipulatable mobile robot and U.S. Pat. No. D812,663, Fetch Robotic's mobile warehouse robot and U.S. Pat. No. 10,423,150, InVia Robotics' autonomous warehouse robots and U.S. Pat. No. 9,731,896, Locus Robotics' warehouse robot and U.S. Pat. No. 10,019,015, Canvas Technology's robots, and MiR's mobile industrial robots.

One problem with conventional autonomous mobile robots is their integral design. Many components form the autonomous navigation structures, such as environmental mapping and proximity sensors, a power supply, control and drive systems, warning systems and a wireless system. These components and their associated wiring are built into the overall robot design. Even when the robot takes the form of a cart, the components that form the autonomous navigation structures are built into the overall cart design. Determining the locations of the various sensors and their wiring so they can perform their intended function while keeping them safe from inadvertent damage and out of the way from interfering with the normal operation of the cart can be particularly challenging. Businesses must either buy manual carts or dramatically more expensive autonomous robotic carts. Due to their complexity, there is no presently known way to convert a manual cart into an autonomous cart. Existing navigation structures are not intended to convert an off-the-shelf, manually pushed cart into an autonomous mobile robotic cart.

Another problem with conventional autonomous vehicles is their dependency on wireless communication with an independent operating system. The robots do not operate independently. They require wireless communication with an off-board database or control system. The operator must interact with the operating system and database via a wireless communication system such as WiFi to control the movements of the robotic vehicle. The cost of installing a wireless communication system such as WiFi can be prohibitively expensive for many organizations. Moreover, even when a wireless communication system is installed, the system may include dead zones that can sever communication with an autonomous vehicle, or cause the vehicle to receive redundant signals when multiple communication cells or transceivers are transmitting a given signal. When the autonomous vehicle stops in a dead zone, the robot must be manual pushed out of the dead zone and reset to advise it of its current location.

A further problem with conventional robotic carts is they are not compatible with manual operation. First, many conventional robotic carts do not allow for manual movement. If a user attempts to push a robotic cart, the wheels drag or turn with a high amount of resistance. Second, robotic carts become disoriented when they are manually pushed to a different location than the location to which the cart last autonomously moved. They cannot determine their location when the robotic cart is turned off and manually moved. When power to the robot microprocessor and drive motor are turned off, the robot loses its ability to track its movements and determine its location. When the robotic vehicle is turned off, its motor encoder does not monitor drive shaft and wheel rotation. As a result, the robotic vehicle loses track of its location when it is turned off and manually pushed. When the robotic vehicle is turned back on, the new location coordinates for the robot must be entered or other means must be used to allow the robot to determine its current location.

A still further problem with conventional robotic vehicles is that unsafe loading conditions go undetected. There is no mechanism to determine the weight of the vehicle or the items placed on it. Similarly, there is no mechanism to determine if the load is unbalanced, which could cause the vehicle to tip over when making a turn. There is also no mechanism to determine if an object is extending outwardly from the vehicle to a point where that item could hit other objects when the vehicle is moving.

The present invention is intended to solve these and other problems.

BRIEF DESCRIPTION OF THE INVENTION

This invention pertains to a robotic cart platform with a navigation and movement system that integrates into a conventional utility cart to provide both manual and autonomous modes of operation. The platform includes a drive unit with drive wheels replacing the front wheels of the cart. The drive unit has motors, encoders, a processor and a microcontroller. The system has a work environment mapping sensor and a cabled array of proximity and weight sensors, lights, control panel, battery and on/off, "GO" and emergency stop buttons secured throughout the cart. The encoders obtain drive shaft rotation data that the microcontroller periodically sends to the processor. When in autonomous mode, the system provides navigation, movement and location tracking with or without wireless connection to a server. Stored destinations are set using its location tracking to autonomously navigate the cart. When in manual mode, battery power is off, and back-up power is supplied to the encoders and microcontroller, which continue to obtain shaft rotation data. When in autonomous mode, the shaft rotation data obtained during manual mode is used to determine the present cart location.

An advantage of the present robotic cart platform is its ability to integrate into conventional, manually moved, utility cart designs. The components forming the robotic cart platform (RCP) include a drive unit, an autonomous mapping and navigation system, environmental mapping and obstacle avoidance sensor, input components and structures that are readily installed on a conventional cart. The drive unit is designed to fit under the cart, which is an area not utilized for payload transport. This area also offers a substantially unobstructed 360 degree view of the surrounding environment, which makes it desirable for mounting the LIDAR sensor. Proximity sensors are positioned near the corners of the cart to give them an optimal view of where the cart is moving. The front caster wheels are removed and replaced by the base unit and its drive wheels. A prefabricated array of electric cables that are harnessed together at one end near their terminal ports is plugged into the drive unit. The individual cables for the proximity sensors and input devices are routed through existing channels and openings in the conventional cart. Existing openings in the risers and trays are also used to mount proximity sensors and lights to convert the conventional utility cart into an autonomous robotic cart. Minimal modifications to the cart are required. Businesses that use conventional, off-the-shelf, manually pushed utility carts can inexpensively convert them into autonomous mobile robotic carts.

Another advantage of the present robotic cart platform is its independent operating system. The present cart platform design has an on-board operating system and database capable of operating independently, and does not require support from an off-board operating system or server. Workers interact directly with the robotic cart to control the movements of the cart. The cost of installing an off-board server and wireless support system is avoided, allowing the benefits of robotic carts to many companies that cannot practically install a WiFi system or otherwise cannot afford a more expensive robotic cart system. In addition, the independent operation of the autonomous cart avoids the problems associated with dead zones that occur in many robotic cart systems.

A further advantage of the present robotic cart platform its compatibility with both autonomous and manual movement of the cart. First, a cart installed with the robotic platform can be manually pushed or pulled. When the drive motors are not powered, the motors allow substantially free rotation of their drive shafts, so the wheels do not drag or turn with a high amount of resistance. Workers can finely move the cart to a precise position, or move the cart when it does not have power. Second, carts installed with the robotic cart platform keep track of their location when manually pushed to a new location. Both the manual mode and the autonomous mode allow the robotic cart to independently determine its location. When power to the robot drive motors and main processor are turned off, a separate power source is activated to run its motor encoder and microcontroller, which continues to track wheel rotations to determine the location of the robotic cart. When the robotic vehicle is turned back on, the microcontroller transmits wheel and shaft rotation data to the main onboard processor to determine the current location of the robotic cart. The robotic vehicle does not lose track of its location when it is manually moved. A worker does not need to enter the new location of the cart, or otherwise require the cart to determine its new location, such as through the use of RFID tags or an off-board WiFi type operating system.

A still further advantage of the robotic cart platform is its harnessed array of cabled sensors, safety/status lights and input devices, such as the control panel, battery and on/off, "GO," and emergency stop buttons. While the drive unit is located under the cart, these components are not. Cabled sensors and lights that need to be substantially unobstructed or highly visible are located in optimal locations on the cart. Input devices that would be awkward to reach and use if placed under the cart, are located at appropriate and easily accessed locations on the cart. Components such as the battery that might need to be periodically recharged or replaced are located at more easily accessible locations. The RCP drive unit circuitry has multiple power supply input terminals, so battery packs can be hot swapped while the RCP processor continues to run. There is no need to power off the RCP processor to charge the batteries. Once the particular off-the-shelf cart is selected, the appropriate harnessed array of cabled sensors is selected so that the necessary number of individual cables and cable lengths is available to hook up the appropriate components for that make and model of utility cart. The cabled sensors and input devices conform to the unique configuration of a particular cart, instead of the cart conforming to the sensors and input devices. Cable lengths are easily changed for varying carts without changing the size, configuration, mounting structures and internal components of the RCP drive unit.

A still further advantage of the robotic cart platform is serviceability. The cables and each of these components are replaced or upgraded without needing to replace or modify the main robotic cart platform. Each cable has ports at both its ends. To remove and replace an external component, such as a sensor, light, control panel, battery, etc., the appropriate cable simply has to be disconnected from the port of that particular external component. To replace the harnessed cable array, the ports at both ends of the cables are disconnected.

As still further advantage of the robotic cart platform is its ease of integration into a conventional cart. The cables are routed through existing channels and openings in conventional carts. The sensors and safety lights are mounted in or via existing openings in the carts. Speakers and WiFi unit are mounted inside compartments in the trays.

A still further advantage of the robotic cart platform is the scanning area of its proximity sensors. Each corner riser of the autonomous cart has four proximity sensors. Two sensors point sideward, and two sensors point forward or rearward. Two sensors are located higher up on the cart frame, and two sensors are located lower on the frame. The higher sensors are angled downwardly and the lower sensors are angled upwardly, so that the scanning cones of paired sensors intersect at about half of the cart height. Should one of the paired sensor fail, the other paired sensor will still cover the area where their scanning cones intersect. The upward angling sensors detect instances where an item placed on a cart extends out from the edge of the cart a significant distance, and a worker is alerted as this can lead to a collision of that overhanging item or an unbalanced payload. The downward angled proximity sensors more reliably detect lower height obstacles and drop offs such as stairwells, which help prevent the cart from falling into a stairwell or out of a shipping dock.

A still further advantage of the robotic cart platform is the location and scanning area of its LIDAR sensor. The sensor is located at a protected location between the drive unit and the lower tray. The LIDAR sensor peers out from between the drive unit and lower tray to scan in almost a full 360 degrees. Only the tops of the drive wheels, drive unit mounting posts and the front caster wheel assemblies obstruct the full 360 degree of view.

A still further advantage of the RCP is its weight sensors. Two weight sensors are located just above the rear caster wheel assemblies, and two sensors are located just above the RCP mounting assembly. These sensors measure the weight of the cart (not including the caster wheels or RCP). The weight measurements are used multiple ways. The cart uses the measurements to determine if an object has been placed onto or taken off of the cart. The cart also uses the weight measurements when the cart is planning its movements (e.g. will need more power for heavier payloads). The cart can also determine if the payload is exceeding a threshold and causing a safety issue, or if the payload is balanced or unbalanced. The cart will then warn a worker and use the weight information to take appropriate action, such as turn at a slow rate or stop altogether. Weight measurements and safety determinations can be performed when the cart is stationary or when it is moving. If there is a change from balanced to unbalanced while moving, the cart can act upon that to prevent the loss of the payload or to inform the user of the imbalance. Lastly, the cart detects when a person presses on the cart (like pressing a button), which is recognized as user input, such as an indication that the cart is empty.

Other aspects and advantages of the invention will become apparent upon making reference to the specification, claims and drawings.

BRIEF DESCRIPTION OF THE DRAWINGS

FIG. 1B is an underside perspective view of the utility cart shown in FIG. 1A showing the structural webbing of the upper and lower trays and risers, and showing one caster wheel assembly in an exploded view.

FIG. 11A is an enlarged side view of the weight sensor assembly of FIG. 3 showing the weight sensor support tab secured between the caster wheel mounting bracket and a spacer plate, with an upwardly facing central raised crown formed into the central areas of the caster wheel mounting bracket.

FIG. 11B is an enlarged side view of the weight sensor assembly of FIG. 3 showing the weight sensor support tab secured between a mounting bracket and a spacer plate, with a downwardly facing central crown formed into the central focal area of the support tab of the sensor plate.

FIG. 11C is an enlarged side view of the weight sensor assembly of FIG. 11B showing the sensor support tab flexing when a load is placed on the cart, the tab and crown moving into the central opening of the spacer plate, and showing a visual display for securing to the cart

DESCRIPTION OF THE PREFERRED EMBODIMENTS

While this invention is susceptible of embodiments in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

Figure 1A:
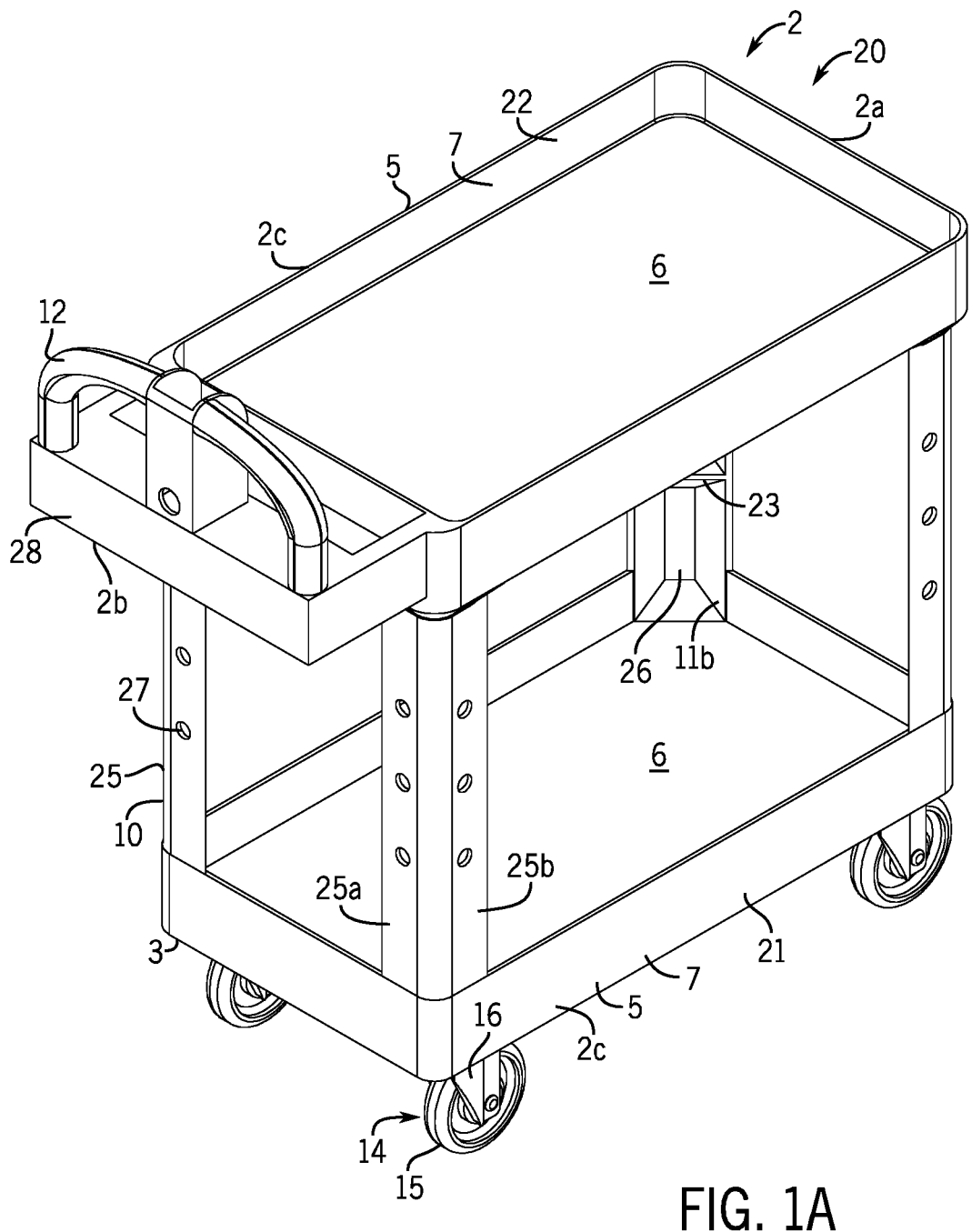
FIG. 1A is an elevated perspective view of a conventional plastic utility cart with a handle for pushing the cart, four caster wheel assemblies, horizontal upper and lower trays, and four vertical risers supporting the trays in stacked, spaced alignment.

Conventional manually pushed utility carts are widely used to move tools, equipment, component parts, partially or fully assembled products and associated paperwork from one room or work station to another throughout a building. An example of a conventional utility cart 2 is shown in FIGS. 1A and 1B. The conventional plastic cart 2 has a front end 2a, rear end 2b and sides 2c. The cart or vehicle 2 has a structure or frame 3 that includes a number of stacked trays 5 and vertical risers 10. Each tray 5 has a generally flat and horizontal surface 6 upon which items are placed and an upwardly extending lip 7 around its perimeter to keep items from sliding or rolling off the tray. Each riser 10 has a generally linear shape with top 11a and bottom 11b ends. Two risers 10 are located at the front 2a of the cart 5, and two risers 10 are located at the rear 2b. The vertical risers 10 join and space apart the horizontal trays 5. The trays 5 are secured proximal the upper 11a and lower 11b ends of the risers 10. A handle 12 is secured proximal the upper ends 11a of the rear risers 10, and extends rearwardly from the rear risers to provide walking space behind the cart 2. Workers grip and hold the handle 12 to push or pull the cart. The underside or bottom of the cart structure 3 or lower tray 5 includes caster wheel mounting structures 8 to firmly and securely mount a number of caster wheel assemblies 14. One caster wheel mounting structure 8 is typically located proximal each lower corner of the cart structure 3 or lower tray 5. The mounting structure 8 includes a number of vertical fastener openings 8a, which are relatively deep to ensure the caster wheels are securely attached to the cart frame or structure 3.

Conventional utility carts 2 typically have four caster wheel assemblies 14. Each caster wheel assembly 14 has a wheel 15 and a swiveling hub 16. Each hub 16 supports an axle 15a that rotatably holds its wheel 15 to allow the wheel to rotate and roll along the floor of the building. Each hub 16 also has a caster mounting structure 17 that swivelingly secures the wheel 15 and hub 16 to the cart mounting structure 8. The upper surface of the caster mounting structure 17 frequently has a central area 17c with a rounded crown 18 with an upwardly facing curved surface 18a shown in FIG. 3. The caster mounting structure 17 is secured to the cart mounting structure 8 by fasteners 19 so that each hub 16 is free to rotate or swivel about a hub mounting axis which allows the wheel to turn to the right or left through 360 degrees (360°) and allows the cart 2 to move in any direction. Each hub 16 is free to directionally swivel or rotate independently of the other caster wheel hubs to allow the cart 2 to be pushed or pulled in any direction through 360 degrees, so the cart can turn, move sideways or back up. Two caster wheel assemblies 14 are located proximal the corners of the front end 2a of the cart 2, and two caster wheel assemblies 14 are located proximal the corners of the rear end 2b of the cart. While the cart 2 is shown to have a certain shape and height, with two trays 5, four risers 10 and four caster wheel assemblies 14, it should be readily understood that the cart can have a variety of shapes and heights, one or more trays, and three or more caster wheel assemblies.

A plastic embodiment 20 of the conventional utility cart 2 is shown in FIGS. 1A, 1B and 6-9. Although the size and shape of the plastic utility cart 20 can vary, the cart 20 shown has a length of about 39 inches, width of about 17 inches, height of about 33 inches and weight of about 31 pounds, and four caster wheel assemblies 14 with five inch diameter wheels. The cart 20 has two robustly designed plastic trays 21 and 22. The stacked trays 21 and 22 have a rectangular shape and a depth of about 2½ inches. Each tray 21 and 22 has structural webbing 23 supporting its upper surface 6. The webbing 23 forms compartments or openings 24 under the surface 6 of the tray. The solid upper wall or surface 6 of each tray uniformly spans the length and width of the rectangular tray 21 and 22. The cart 20 has four robustly designed plastic risers 25. Each riser 25 has an L-shaped cross-sectional shape with perpendicular sides 25a and 25b that form an inner channel 26 along its vertical length. Each riser 25 has a forwardly or rearwardly facing side 25a and a sidewardly facing side 25b. Openings 27 are formed at spaced locations along the vertical height of both sides 25a and 25b of each riser 25. Each riser 25 has three forwardly or rearwardly facing openings 27, and three sidewardly facing openings 27. The upper tray 22 includes an integrally formed rearwardly cantilevered tray 28. The handle 14 extends upwardly from the rear end 2b of the cantilevered tray 28. Each of the caster wheel mounting structure takes the form of a plate or bracket 17 that is secured by four fasteners 19, such as screw-type fasteners. The fasteners 19 extend through bracket holes 17a in bracket perimeter portion 17b, and into the four aligned holes 8a of the mounting structure 8 to firmly secure a caster wheel assembly 14 to the cart structure 3 or lower tray 21.

Figure 12:
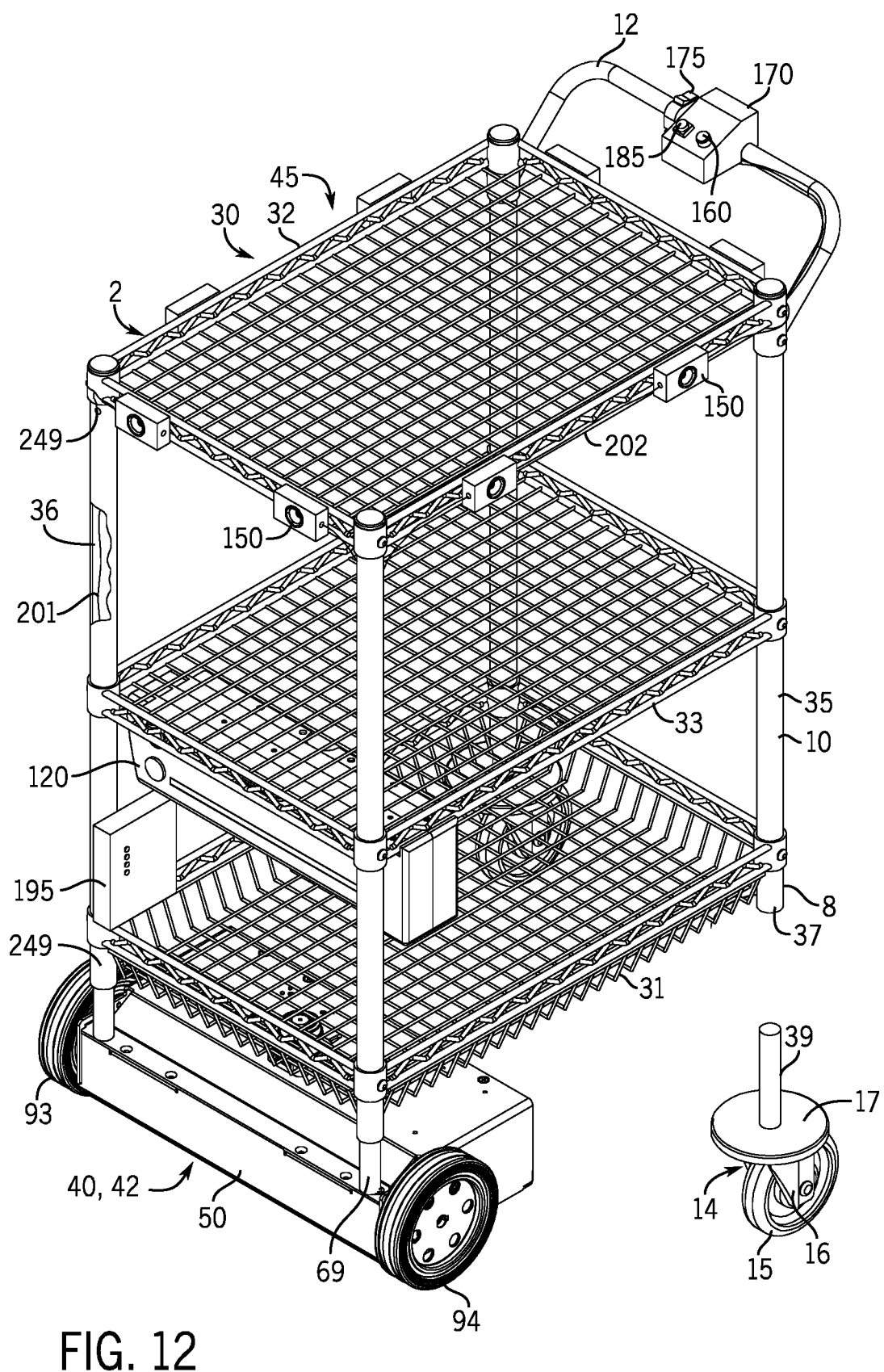
FIG. 12 is a perspective view of the robotic cart platform integrated into a conventional metal utility cart with wire upper, lower and middle trays, tubular risers and a tubular handle, with its front caster wheels replaced by the wheeled autonomous base unit, and showing its on/off switch, control panel with an LED light and GO button, battery pack, proximity sensors and WiFi unit secured to the cart, and showing an exploded view of a rear caster wheel assembly.

A metal embodiment 30 of the conventional cart 2 with its two front caster wheel assemblies 14 removed is shown in FIG. 12. This cart 30 has three robustly designed lower 31, upper 32 and middle 33 wire mesh trays or baskets. The stacked trays 31-33 have a rectangular shape. The corners of the trays 31-33 are joined together by four metal, vertical, tubular risers 35. Each tubular riser 35 has an open interior 36 and an open bottom end 37. The mounting structure 18 of each caster wheel assembly 14 takes the form of a mounting bracket or plate 17 with an upwardly extending mounting post 39. Each mounting post 39 is secured to the cart mounting structure 8, which takes the form of the open bottom end 37 of the tubular risers 35 that receives the post 39 in an in-line manner.

Figure 7:
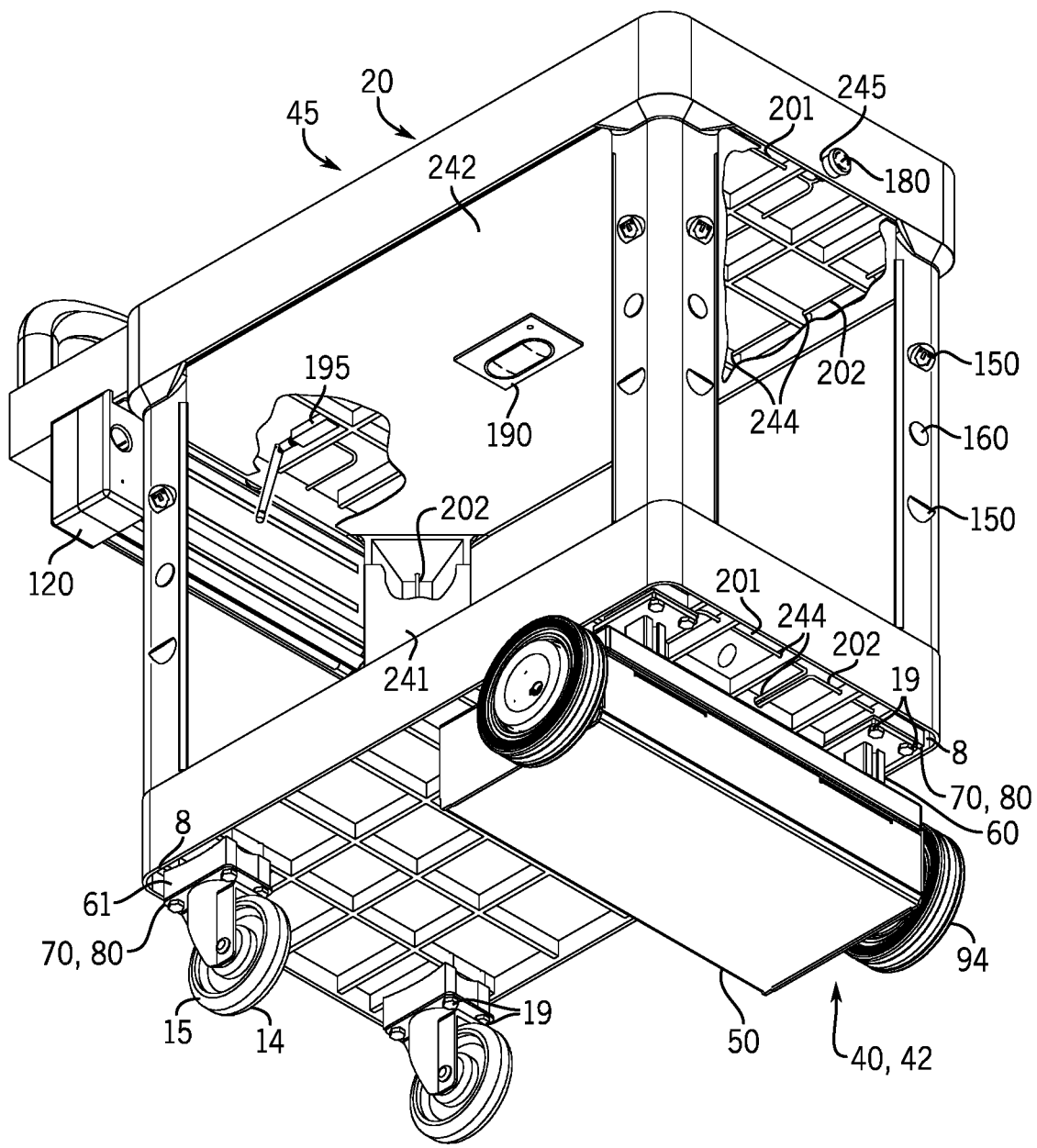
FIG. 7 is a lower perspective view of the autonomous cart of FIG. 6 showing the wheeled autonomous drive unit and an emergency stop button at the front of the cart, a riser cover panel, and an audio speaker secured under the upper tray with a portion of a underside cover panel cut away to show the optional WiFi communication unit.
Figure 8:
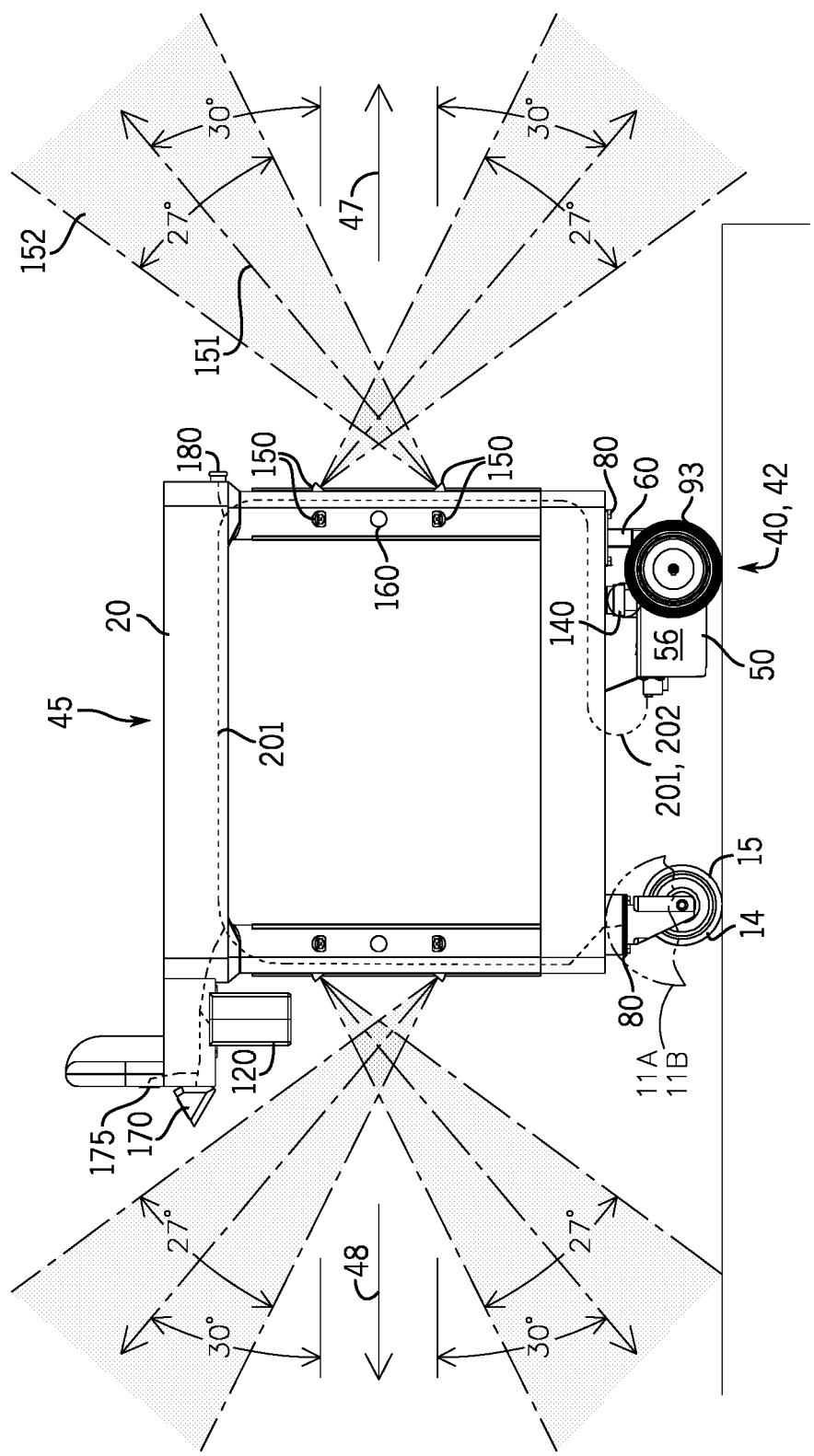
FIG. 8 is a side view of the autonomous utility cart of FIG. 6 equipped with the robotic cart platform and showing the scanning cones of the proximity sensors.
Figure 9:
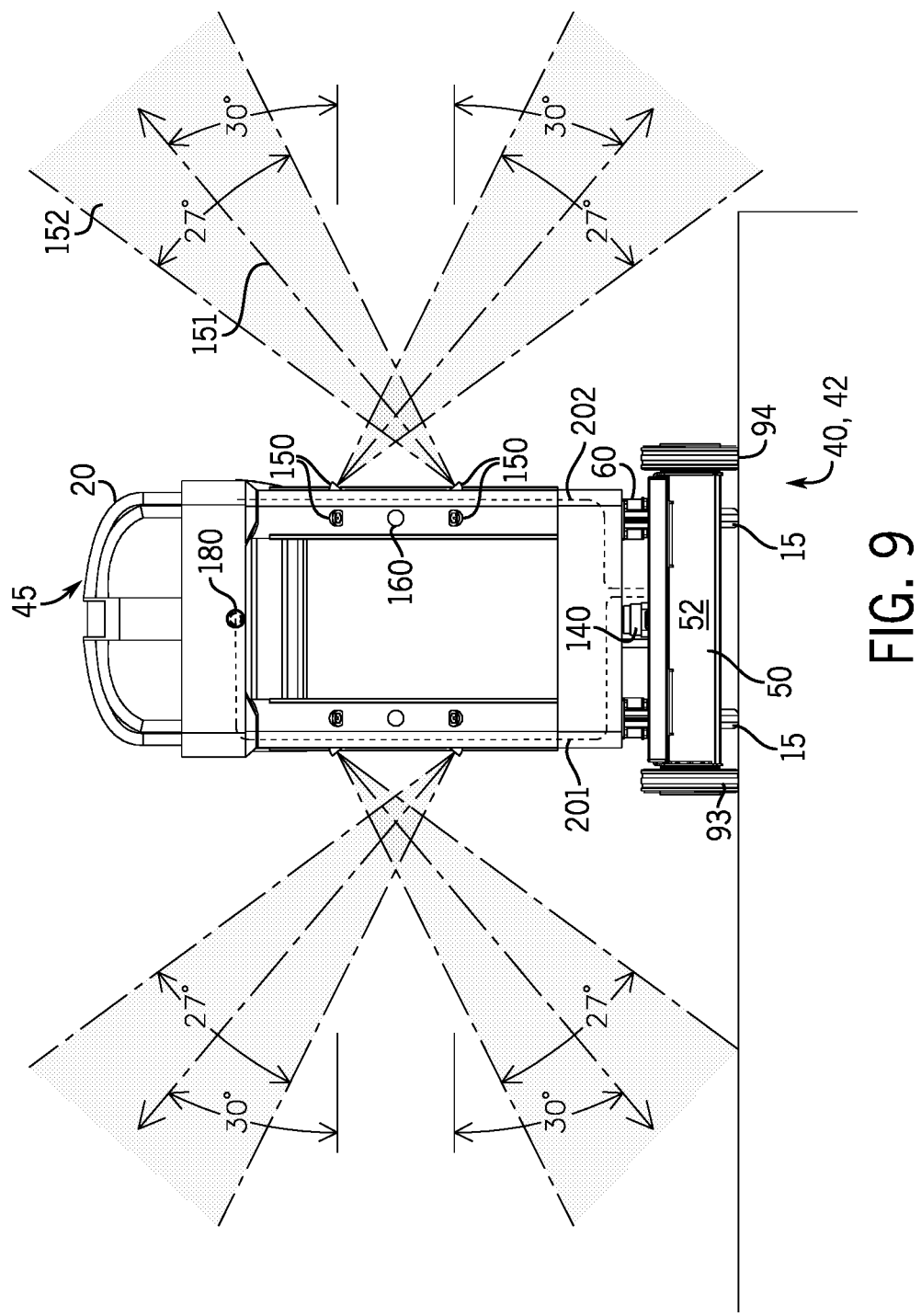
FIG. 9 is a front ear view of the autonomous utility cart of FIG. 6 equipped with the robotic cart platform and showing the scanning cones of the proximity sensors.
Figure 10:
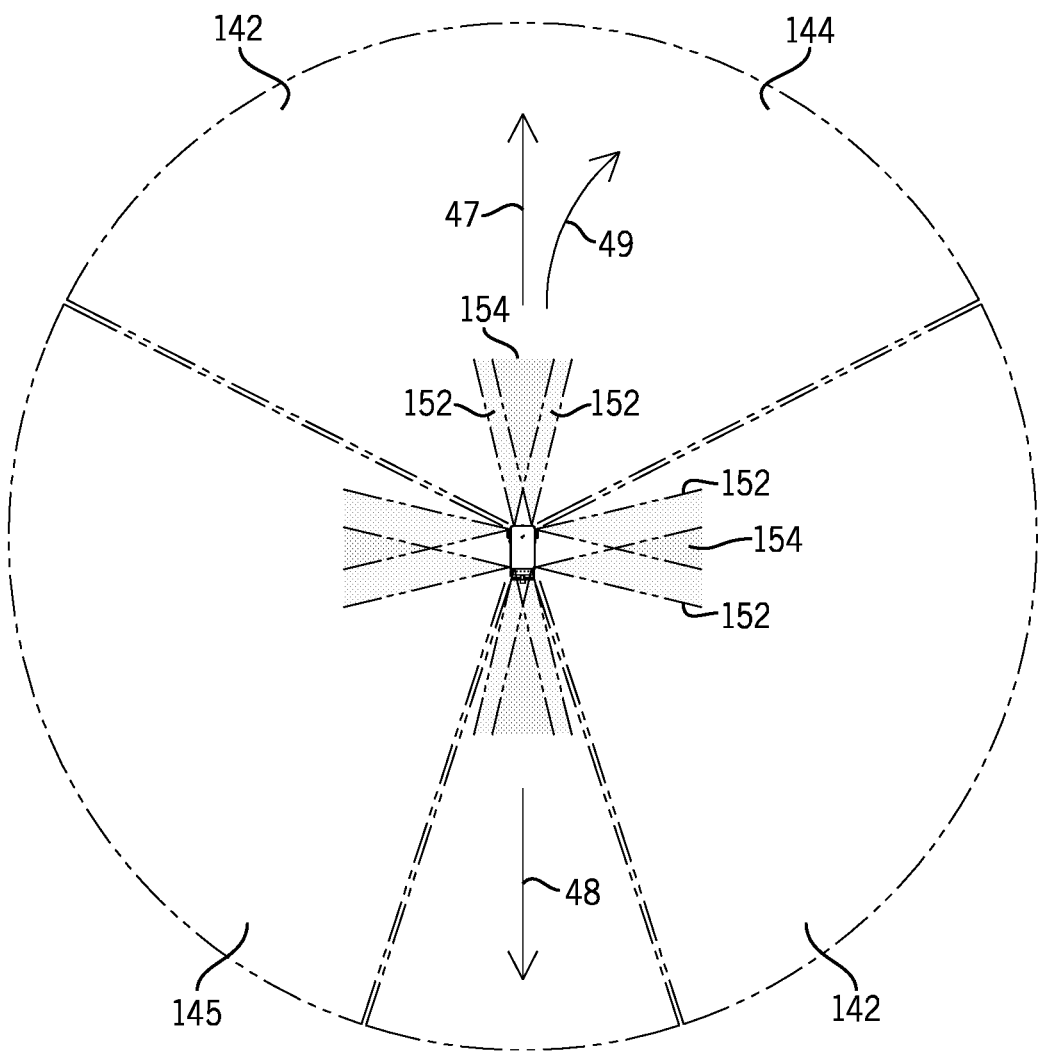
FIG. 10 is a top view showing the scanning area of the LIDAR scanner and the scanning cones of the proximity sensors.

The present invention pertains to a robotic cart platform system integrated into a conventional cart 2, 20, 30 to form an autonomous robotic cart or vehicle generally indicated by reference numbers 40 and 45 as shown in FIGS. 2-12. The components forming the robotic cart platform 40 and its navigation and movement system 42 are shown in FIG. 2-5B. The integration of these components into a conventional plastic 20 or metal 30 cart to form an autonomous cart 45 with the navigation and movement system 42 is shown in FIGS. 6-12. The robotic cart platform 40 has a drive unit 50 that propels itself and the autonomous cart 45 in a forward 47 or rearward 48 direction of travel, and can readily turn by moving in arcuate directions 49 of travel as shown in FIGS. 8 and 10.

The robotic cart platform or RCP 40 has a motor driven autonomous drive unit 50 shown in FIGS. 2-5B. The RCP 40 and its navigation and movement system 42 use the wheeled drive unit 50 to autonomously propel the cart 20, 30. The drive or base unit 50 is compact and has a low profile to fit under the cart structure 3 or lower tray 21, 31. The drive unit 50 has a weight of about 20 kilograms, width of about 45 centimeters, height of about 11 centimeters, length of about 23 centimeters and a top speed of about 2 meters per second. The drive unit 50 has a generally rectangular block shaped housing 51 with a front, rear, top, bottom and right and left sides 52-57. The front 52 of the drive unit is located even with or proximal the front 2a of the cart structure 3 or lower tray 21, 31. The front 52 and rear 53 sides are generally parallel, as are the top 54 and bottom 55 sides, and the right 56 and left 57 sides, respectively.

Figure 4:
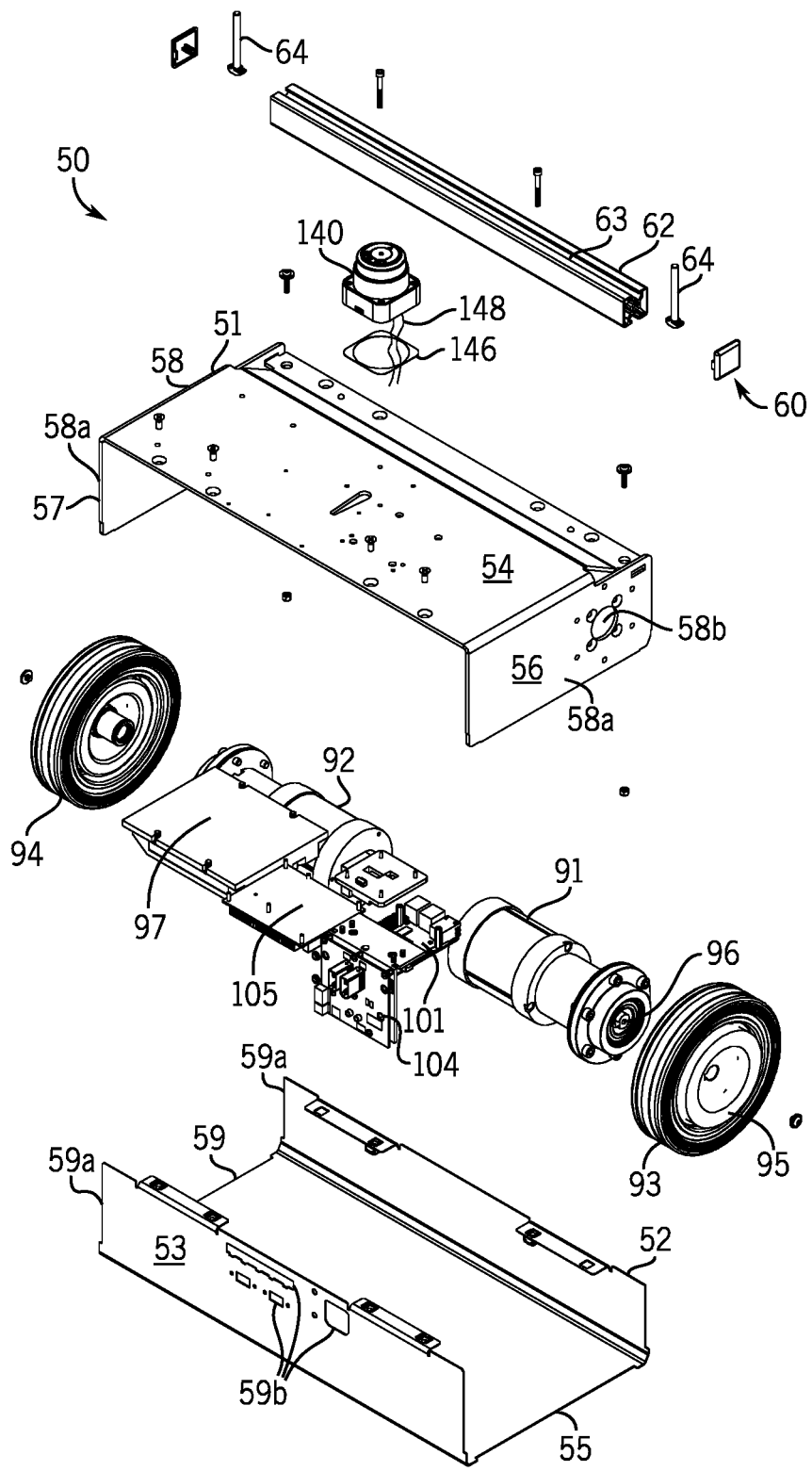
FIG. 4 is an exploded view of the autonomous drive unit showing its housing, adjustable mounting track, LIAR sensor, drive motors, drive wheels, motor controller and circuit boards.

The housing 51 is robustly designed to maintain its shape during use, and is formed by upper 58 and lower 59 metal portions best shown in FIG. 4. The load-bearing upper portion 58 is made of ¼ inch plate steel, and has side flaps 58a that form the right and left housing side surfaces 56 and 57. The lower portion 59 is made of 18 gauge sheet metal, and has flaps 59a that form the front and rear housing surfaces 52 and 53. The thick metal construction of the housing 51 acts as a heat sink to dissipated heat from internal electrical components. The top surface 54 of the upper portion 58 has a central LIDAR scanner opening. The side flaps 58a have wheel holes 58b aligned to form a linear wheel axis parallel to the front and rear housing surfaces 52 and 53. The rear flap 59a includes a series of punch-outs or openings 59b for the input/output terminals or connections of various external input and communication devices, such as sensors, lights, power supply, control panel and optional WiFi unit.

Figure 3:
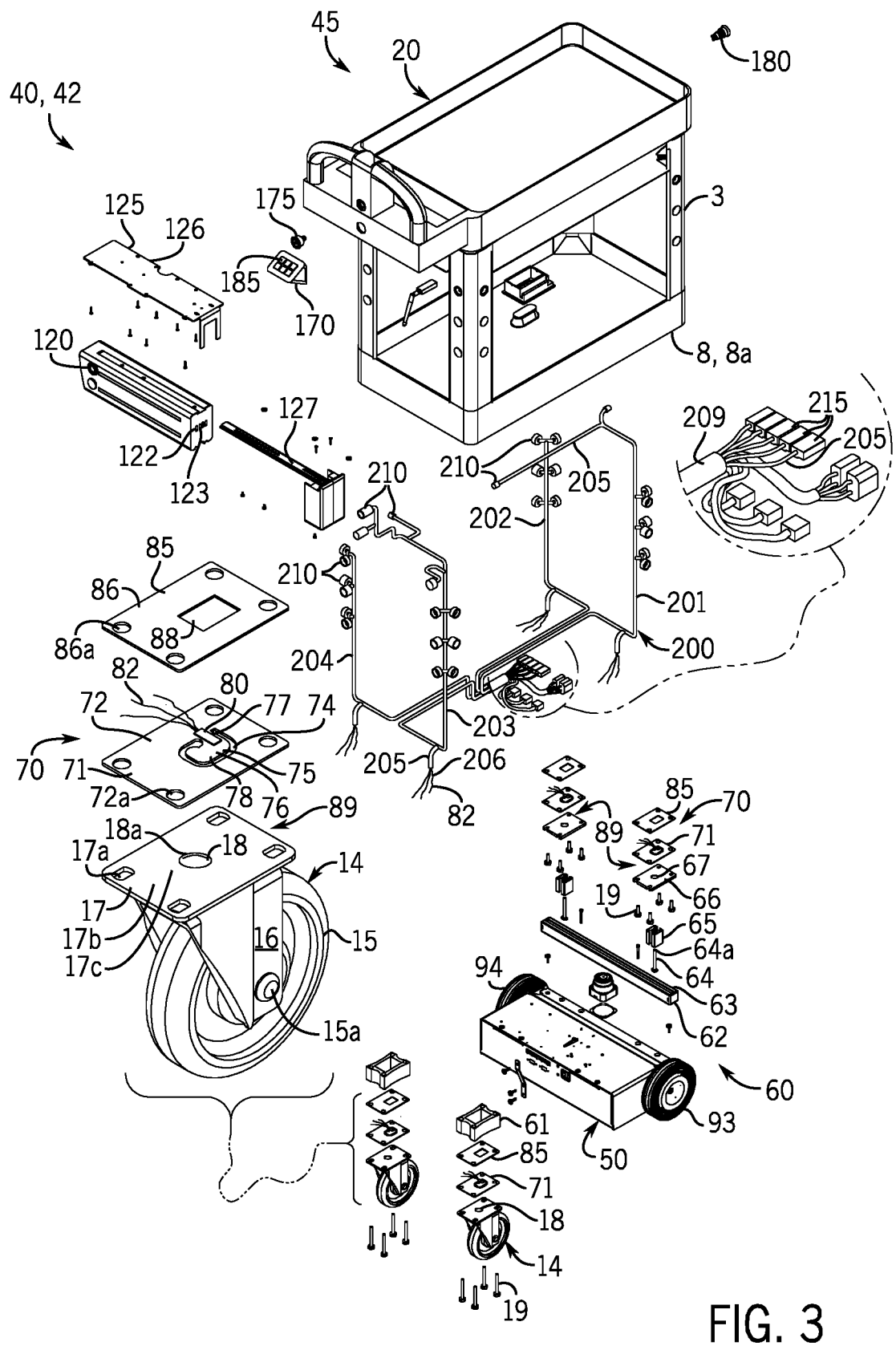
FIG. 3 is an exploded view of the autonomous cart and robotic cart platform showing the orientation of its components relative to the conventional plastic utility cart of FIG. 1A, and showing the conventional rear caster wheel and weight sensor assemblies, adjustable front mounting and weight sensor assemblies and battery pack and mounting bracket assembly.

An adjustable mounting assembly 60 secures the autonomous drive unit 50 to the conventional utility cart 20, 30 as shown in FIG. 3. To adjust for the height of the RCP 40 and its mounting assembly 60, spacers 61 are inserted above each of the rear caster wheel assemblies 14. The adjustable mounting assembly 60 includes a mounting bracket or bar 62 rigidly secured to the top 54 of the housing 51 along the front end 52 or edge of the housing 51. The bracket 62 has a cross-sectional shape forming a generally upside-down T-shaped opening along its length. The bracket 62 and T-shaped opening form an adjustable mounting track 63 along the length of the bracket. The adjustable assembly 60 and bracket 62 accommodate both a cart 20 with a caster wheel mounting structure 8 formed with fasteners holes 8a, and a cart 30 with a caster wheel mounting structure formed by a mounting bracket 17 with a mounting post 39 that is received by the open bottom ends 37 of the tubular cart risers 35. For a cart 20 with a caster wheel mounting structure that takes the form of mounting brackets 17 and fasteners 19 (FIGS. 3, 4 and 7), headed fasteners 64 are slidingly received by the track 63 and matingly held by the bracket 62. The wider head of each headed fastener 64 is received inside the broader portion of the T-shaped track opening with the narrower elongated shaft of the fastener 64 extending upwardly through and out of the narrower portion of the T-shaped track 63. A spacer 65 is placed over each of the two fasteners 64 to adjust the height of the drive unit 50 and mounting assembly 60. A mounting plate 66 is secured to the upper protruding end of the fastener 64. The mounting plate 66 has a threaded hole 67 for receiving the threaded shaft of the fastener 64 to securely fix and set the height of the mounting plate 66. When assembled, the top or tip 64a of the threaded fastener 64 protrudes through hole 67a predetermined amount to form a raised abutment above the upper surface of the mounting plate 66. As discussed below, the focusing area 78 of the sensor plate 71 rests on the tip 64a of the fastener 64, which forms a gap 89 (FIG. 11A) between the mounting and sensor plates 66 and 71. For a cart 2, 30 with a caster wheel mounting structure that takes the form of a mounting bracket 17 with mounting post 39, headed mounting posts 69 are used as shown in FIG. 12. The height of the drive unit 50 and mounting assembly 60 generally equals the height of the rear caster wheel assemblies 14 and spacers 61 so that the cart 2, 20, 30 and their trays 5, 21-22, 31-33 are level.

Figure 2:
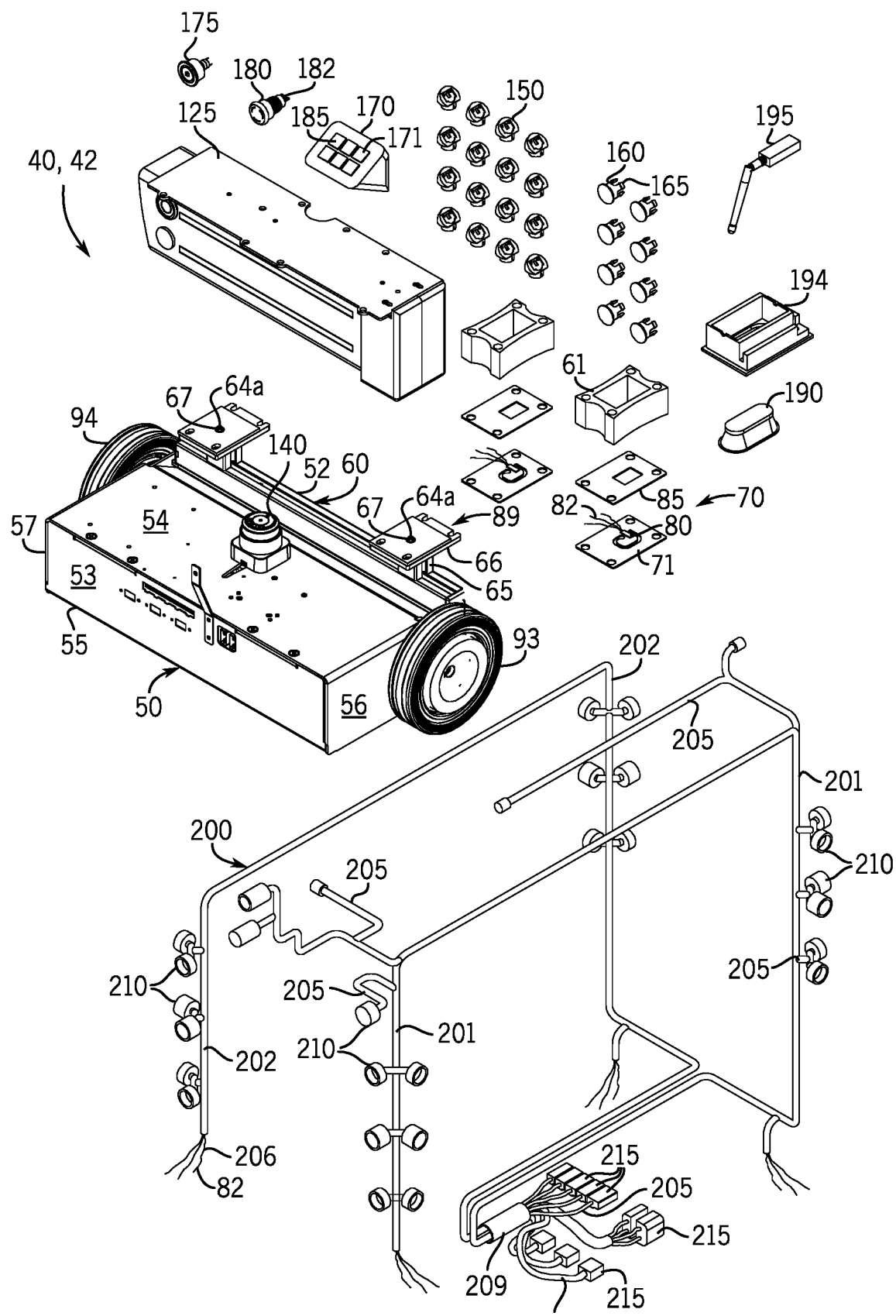
FIG. 2 is a view showing the robotic cart platform components, including an autonomous drive unit with its adjustable mounting assembly, a top mounted LIDAR scanner, six button control panel, battery pack, sixteen proximity sensors, eight safety lights, a "GO" button, an emergency stop buttons, weight sensors, audio speaker, optional WiFi communication unit, and an array of electric cables to connect these components to the circuitry input ports of the autonomous drive unit.

The cart has four weight sensor assemblies 70. Two weight sensor assemblies 70 are located directly above the mounting plates 66 of the mounting assembly 60 as shown in FIGS. 2, 3 (bottom right) and 11B, and two weight sensor assemblies are located directly above the mounting structure or bracket 17 of the rear caster wheel assemblies 14 as shown in FIGS. 3 (bottom left), 11A and 11B. Each sensor assembly 70 includes a sensing plate 71 and a spacer plate 85. The sensor plate 71 has a perimeter portion 72 with fastener openings 72a. The plate 71 has a generally U-shaped slot or opening 74 is cut out of the plate around and proximal its center to form an inwardly extending weight supporting tab 75. The support tab 75 extends from one side of the perimeter portion 72 toward and into the center of the plate 71. The support tab 75 has an upper surface 76, a semi-flexible neck 77 and a weight supporting central area 78. When needed, the central area 78 has a downwardly facing dimple or depression 79 with curved surface 79a. (FIG. 11B). The neck 77 is semi-flexible in that it elastically bends a slight amount (less than about an eighth of an inch) depending on the weight or force applied, but continues to support the weight of the cart 45 and items or payload placed on the cart. A weight sensor 80 such as a piezoelectric sensor is secured to the upper surface 76 of the semi-flexible neck 77. The sensor 80 is in electrical communication with the RCP circuitry via wires 82, or a visual display 90 with a programmed processor 90a secured to the cart structure.

Figure 16A:
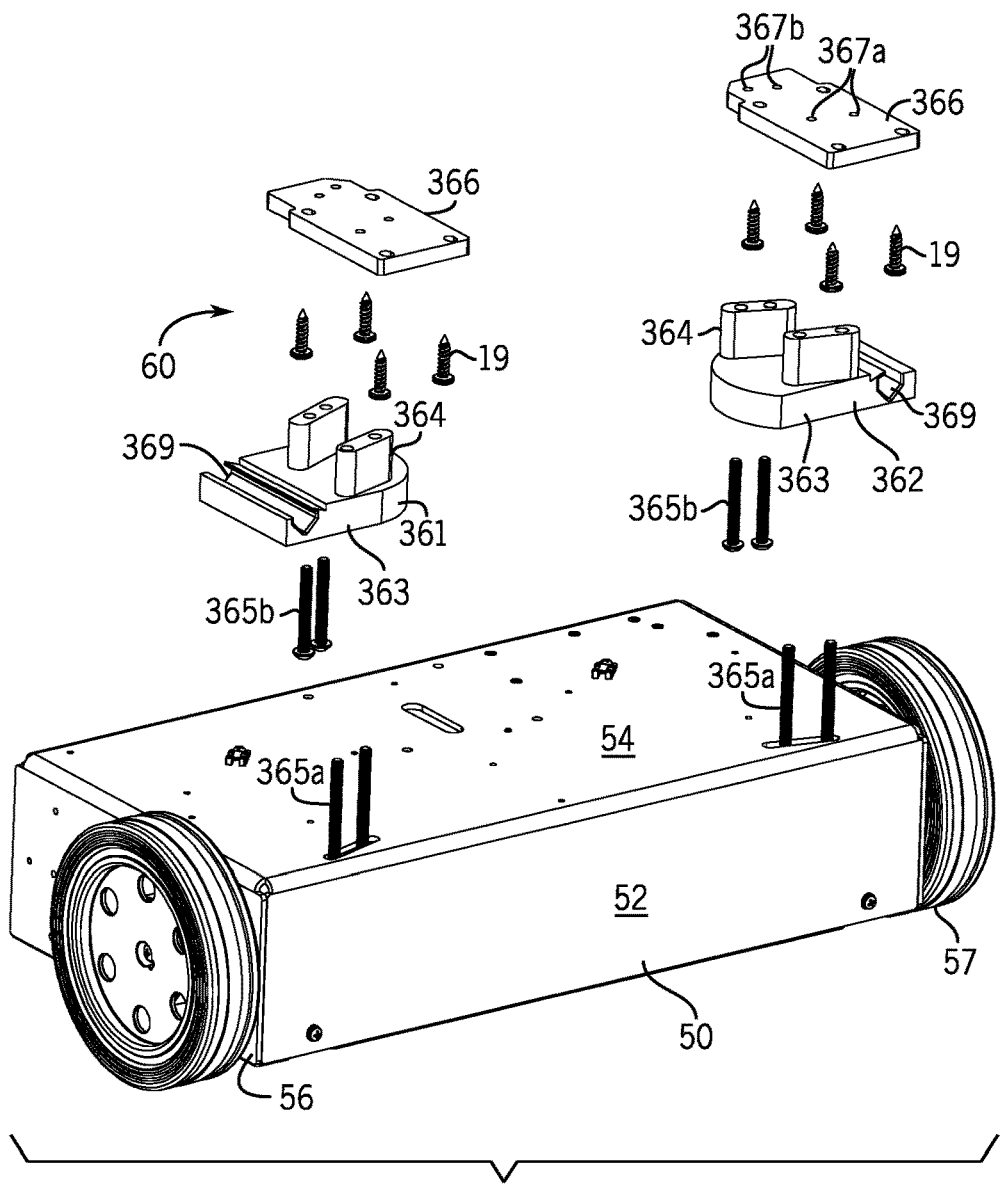
FIG. 16A is an exploded perspective view showing an alternate mounting assembly and mounting bracket for securing the drive unit a conventional cart, with FIG. 16B showing the underside of one of alternate mounting brackets.

The spacer plate 85 is located above the weight sensing plate 71. The spacer plate 85 has a perimeter portion 86 with fastener openings 86a, and a hollowed out center opening 88. The central opening 88 accommodates the upward flexing of the support tab 75, and provides a pathway for routing the sensor wires 82. The central weight focusing area 78 of the sensing plate 71 rides on top of and is in weight supporting engagement with mounting plate 17 (FIGS. 11A and 11B) or fastener tip 64a of mounting plate 66 as in FIG. 2-4. In some situations, such as for the two rear weight sensor assemblies 70, the upwardly extending central crown 18 of the caster wheel mounting plate 17 supportingly engages the bottom surface of the central focusing area 78 as shown in FIG. 11A. In other situations, such as for the drive unit mounting assembly 60, the downwardly facing dimple or depression 79 (FIG. 11B) of the focusing area 78 rides on and engages the upper surface of the mounting bracket 66 or 366 as shown in FIGS. 11B and 16A. The sensing and spacer plates 71 and 85 above the rear caster wheel assemblies 14 are located between the caster mounting bracket 17 and lower surface of the cart mounting structure 8. The sensing and spacer plates 71 and 85 above the drive unit mounting assembly 60 are located between the upper surface of each mounting plate 66 and the lower surface of the cart mounting structure 8.

The weight of the cart 20, 30 is supported by the central focusing areas 78 of the support tabs 75 of the four sensor plates 71. The sensor 80 is firmly secured to the semi-flexible portion or neck 77 of the sensor plate 71. The deformation of the support tab 75 by the weight of the cart 2, 20, 30 and its load causes a change in resistance in the sensors 80. The sensor 80 changes resistance when force is applied to the focal area 78 or dimple point 79 of plate 71. This change in resistance data or weight level data is sent to the RCP processor 102 and automatically used by the RCP processor to determine a digital weight measurement of the amount of weight carried by each sensing plate 71. The weight measurement data is then used by the higher-level functions of the RCP processor. For example, to compare the weight measurement data with a weight threshold value stored in the memory 103 to determine if the payload is beyond a threshold or maximum supportable weight, or to determine if the load is balanced or unbalanced. For a balanced load, each sensor plate 71 carries a quarter of the load weight. For unbalanced loads, one or two sensors carry significantly more of the load weight than the other sensor plates. The processor then sends a digital warning message to the control panel 170 (discussed below) to display a warning message via an icon on a key (such as "load capacity exceeded," "unbalanced load" and lighting the key "red"). Although the weight sensor 80 is shown and described as being a strain gauge sensor, such as a piezoelectric sensor, it should be understood that other embodiments such as a force resistor may also be used.

Figure 5A:
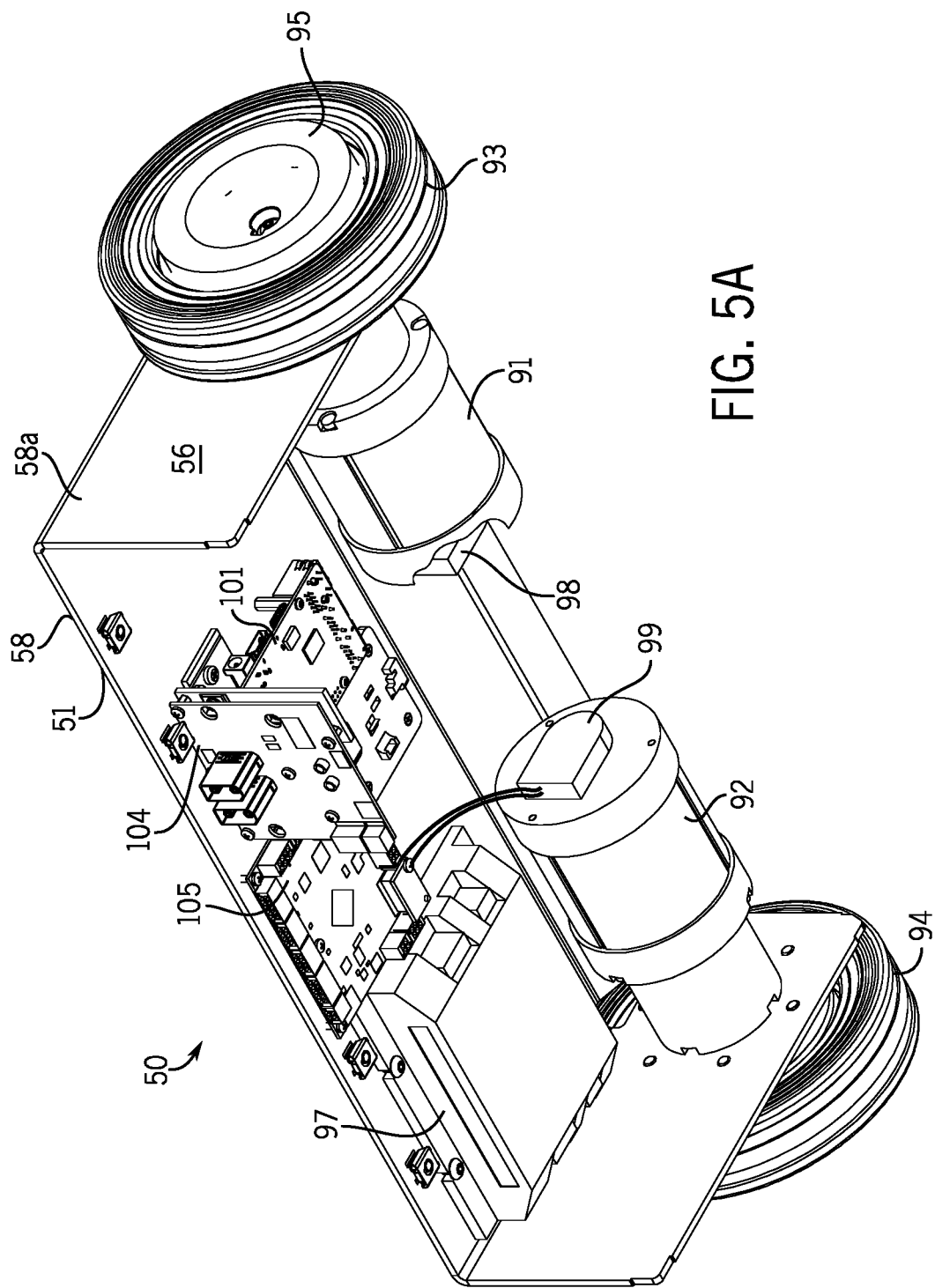
FIG. 5A is a bottom perspective view of the autonomous drive unit with the lower half of its housing removed to show the drive motors, drive wheels, encoders, motor controller, circuit boards and circuitry, contacts for the LIDAR scanner and encoders, and the input ports for the externally mounted proximity sensors, safety lights, on/off switch, "GO" and emergency stop buttons, control panel and battery.
Figure 5B:
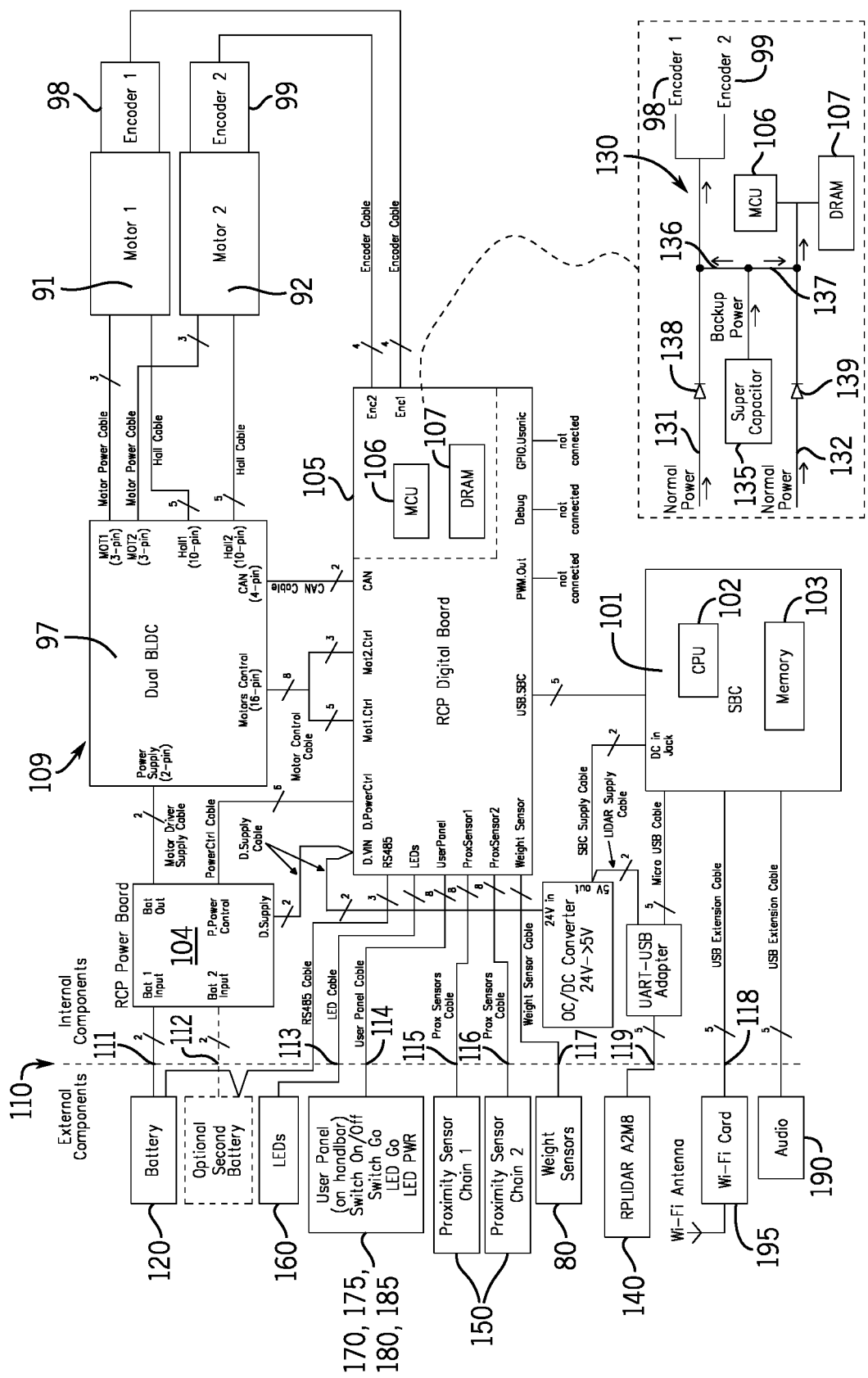
FIG. 5B is an electrical schematic showing various components and the circuitry of the autonomous drive unit, including a back-up power circuit with a super capacitor supplying back-up power to the encoders, microcontroller (MCU) and dynamic rapid access memory (DRAM).
Figure 6:
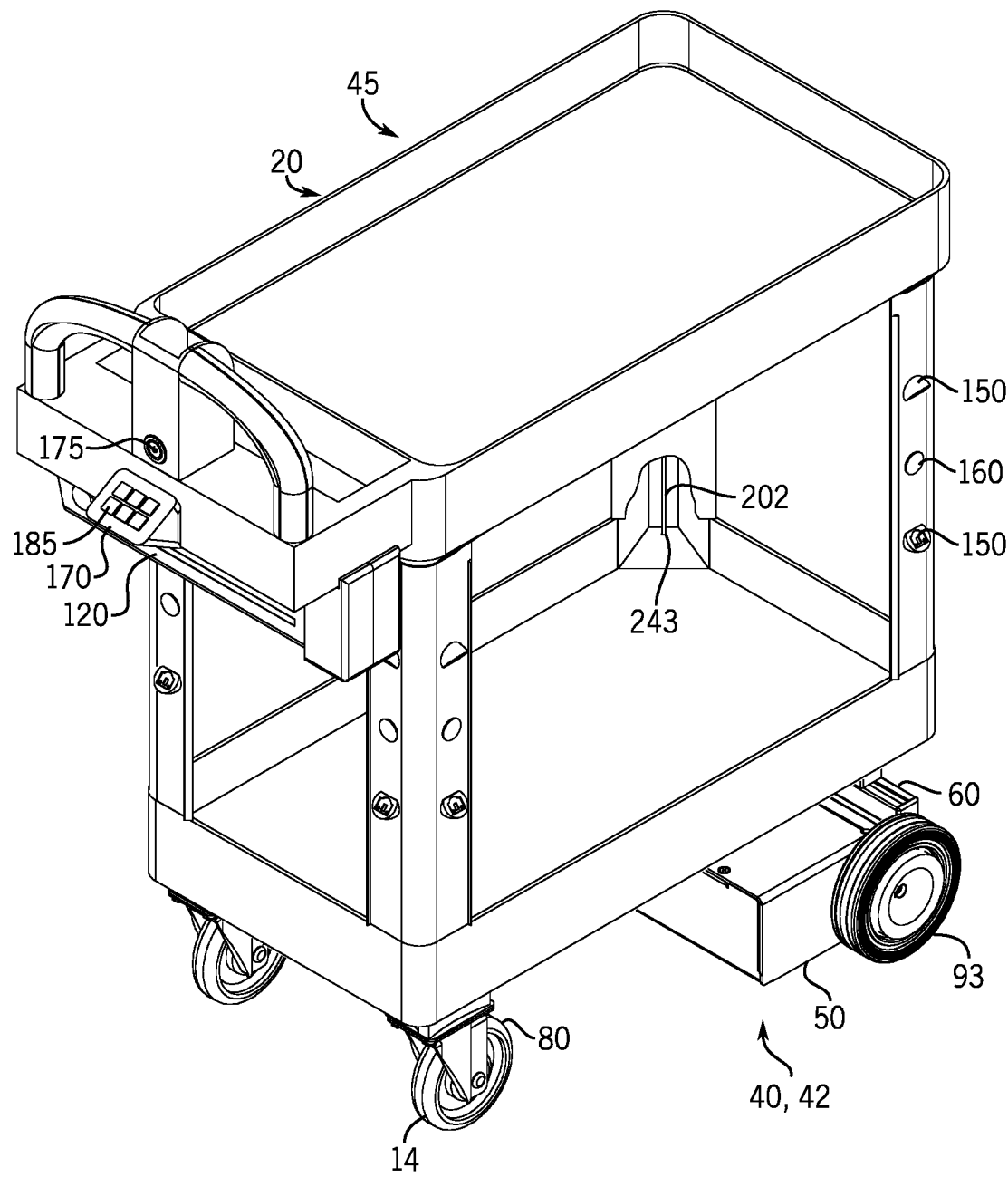
FIG. 6 is a perspective view showing the robotic cart platform integrated into the conventional plastic utility cart of FIG. 1A to form an autonomous cart with its drive unit replacing the front caster wheels, and showing its six button control panel, battery pack and array of cabled proximity sensors, safety lights and "GO" button.

The drive unit 50 has two drive motors 91 and 92 and two drive wheels 93 and 94 as shown in FIGS. 4, 5A and 5B. Each wheel 93, 94 has a hub 95 that securely receives the drive shaft or wheel axle 96 of its associated motor 91 or 92. The motor 91 on the right side 56 of the base unit 50 drives the right wheel 93, and the motor 92 of the left side 57 of the base unit drives the left wheel 94. Each motor 91 and 92 independently drives or turns its associate drive shaft 96 and wheel 93 or 94. Each motor 91 and 92 can turn its drive shaft 96 and wheel 93 or 94 either in a clockwise direction or a counterclockwise direction. The independent operation of the drive motors 91 and 92 allows the RCP drive unit 50 to rotate in place, and allows the autonomous cart 20, 30 to make turns with a minimal distance of travel.

The right and left motors 91 and 92 are mounted to the inside surface of the right and left sides 56 and 57 of the housing 51, respectively. The motors 91 and 92 are securely mounted by screw fasteners, so that their drive shaft or wheel axle 96 extends through the housing wheel openings 58b in side flaps 58a. The wheel axles 96 are colinear, and the drive wheels 93 and 94 are parallel to the sides 2c of the cart 2. The wheels 93 and 94 do not swivel to the right or left as do the rear caster wheels 15. Turns are taken by differing the rate of rotation or direction of rotation of the right and left drive wheels 93 and 94. The wheels 93 and 94 have a diameter of about six inches and are sized and positioned outside of housing 51 with their outer perimeters riding along the ground. There is preferably about 1.1 inch of clearance between the bottom 55 of the housing 51 and level ground so that the RCP 40 can traverse deviation in the ground surface. The drive wheels 93 and 94 are also sized in combination with the height of the base unit 50 and its mounting assembly 60 to ensure the cart 20, 30 is level.

When the RCP 40 is turned on or activated, the cart 20, 30 is in its autonomous mode. Electric power is supplied to the motors 91 and 92, which turn their respective wheels 93 and 94 to propel the cart from one location to another along straight 47, 48 or curved 49 paths of travel. When the RCP 40 is turned off or deactivated, the cart 20, 30 is in a manual mode, and power to the motors 91 and 92 is cut off. The deactivated motors 91 and 92 do not inhibit the free rotation of the drive wheels 93 and 94 so that workers can readily push or pull the cart 20, 30 from one location to another. The drive motors 91 and 92 are preferably brushless direct current (BLDC) motors with both clockwise and counterclockwise rotation connected to a planetary reduction gearbox. Each high torque electric motor 91, 92 has a length of about 6 inches, diameter of about 3 inches, rated voltage of about 24 volts, no-load speed of about 600 rotations per minute, rated torque of about 1.5 kilograms-centimeters and a reduction ratio of about 1/10 and output shaft diameter of about ¼ inch. The output shaft 96 extends from the motor housing about 0.6 inch, and the end of the shaft is notched to facilitate the rotationally locked securement of its associated wheel 93 or 94.

The motors 91 and 92 are interfaced to an associated dual motor controller 97. The rotational speed and direction (clockwise or counterclockwise) of each output shaft 96 is controlled by the controller 97, which is in electrical communication with motor 91 or 92 and controls the electric power supplied to each motor. The controlled power supply to each motor 91 or 92 via the motor controller 97 controls the speed of drive shaft 96 of each motor, and thus the rotational speed of the drive wheels 93 and 94. The controller 97 is preferably a brushless direct current (BLDC) motor controller with a 6.5 to 50 volt input, 350 watt brushless DC motor speed regulator control module, a 12 volt, 24 volt, 36 volt and 48 volt high power BLDC speed motor controller driver board with heat sinks and 0 to 5 volt PWM duty ratio control with an FG pulse signal and 9 pulse/round.

Each motor 91 and 92 is interfaced to an associated "always-on" encoder 98 and 99. Each encoder 98 and 99 has a rotary disk and output cable. Each rotary disk is mounted to its respective motor 91 or 92 to optically view the rotational movements of its associated motor drive shaft 96, and thus the rotational movements of its associated wheel 93 or 94. The rotary disk transmits this shaft rotational movement data or information via its output cable to the microcontroller 106 and its memory 107, which is then periodically transmitted to the RCP processor 102 and its memory 103. This shaft rotation or wheel movement data is used by the RCP processor 102 to determine the distance of travel and path of travel taken by the RCP 40 and autonomous cart 45 from its start location or start location coordinates, and to determine the coordinates or coordinated data associated with the current physical location 100 of the RCP 40 and cart 45. The high impact resistance encoders 98 and 99 preferably have a power supply of about 5 volts DC, resolution of about 400 pulses per rotation, speed of about 2400 rotations per minute, optical disk with a thickness of about 0.05 inches, diameter of about one inch and hole diameter of about 0.47 inches, AB 2 phase output, and line driver with ABZA-B-Z channels.

The RCP navigation and movement system 42 and drive unit 50 have circuit boards including a single board computer 101, power board 104 and digital board 105 as shown in FIGS. 5A and 5B. The single board computer 101 includes the main processor or CPU 102 with associated long-term hard drive memory 103. The digital board 102 includes a microcontroller 106 with associated short-term dynamic rapid access memory or (DRAM) 107. Circuitry 109 interconnects the boards 101-103, processor 102, microcontroller 106 and their associated memories 103 and 107, motor controller 97, drive units 91, 92 and encoders 98, 99, as well as components external to the housing 51, such as weight sensors 80, power supply, LIDAR scanner 140, proximity sensors 150, safety lights 160, control panel 170, etc., as discussed below. Components mounted inside the drive unit housing 51, such as motors 91 and 92, motor controller 97 and encoders 98 and 99, are wired for power and communication with the processor 102 and microcontroller 106 directly to connections in the drive unit circuitry 109. Devices mounted on the cart structure 3 external to the drive unit 50 are electrically connected for power and communication to the drive unit circuitry 109 and circuit boards 101, 104 and 105 via a number of input/output terminals or ports 110, including two battery ports 111 and 112, LED lights port 113, control panel port 114, two proximity sensor line ports 115 and 116, weight sensor port 117, WiFi port 118 and an audio port. The LIDAR scanner mounted atop the drive unit 50 is wired directly to LIDAR connections in the circuitry 109 or to a LIDAR port 119. The control panel port 114 is equipped to power and communicate with switches, such as an On/Off switch, and "GO" and emergency stop buttons, discussed below.

Data processing by the navigation and movement system is handled by the programmed RCP processor 102 and microcontroller 106. The microcontroller 106 runs low level firmware that provides very fast, real time processing. The RCP processor 102 provides higher level functionality such a planning a route 149 and motor movement instructions for the RCP 40 and communicating with workers via the safety lights, control panel, audio speakers and WiFi unit, as discussed below. RCP mapping data obtained by the LIDAR sensor 140 flows from the microcontroller 106 to the main RCP processor 102. The microcontroller 106 saves mapping data in its short-term memory or DRAM 107, and then periodically conveys that data to the RCP processor 102 for storage in its long-term hard drive memory 103. Both the processor 102 and microcontroller 106 do some processing of data. For example, the microcontroller 106 use the proximity sensors 150 to scan or detect an obstacle that is present for several seconds then goes away (someone walking by). As the microcontroller 106 passes this data to the RCP processor 102, the RCP processor filters out the temporary or passing obstacle data from long term storage 103 since the obstacle was more momentary and not long term like a wall, pillar or the edge of a loading dock. The RCP processor 102 has both associated dynamic memory, such as DRAM that is deleted from storage when power is removed, and long term hard drive memory 103 that remains stored even when power is removed.

The RCP 40 includes a portable power supply or battery pack 120 mounted to the autonomous cart 45. The battery 120 has power and communication ports 122 and 123, and supplies electric power to all the internal and external components and devices of the RCP 40 via its drive unit circuitry 109 and terminals 110. The battery pack 120 is secured to the cart 45 at a location that avoids interfering with loading and unloading the cart or impairs other activities of the workers using the cart, and allows easy access for swapping out a first battery pack with a second replacement battery pack when the first battery pack needs recharging. The power source 120 is designed to provide sufficient power to the RCP 40 for a four hour work shift and propel the cart for 500 to 1,500 meters carrying a 50 to 100 kilogram payload at a walking speed of about one meter per second. The power source 120 is preferably a multi-cell battery pack with multiple lithium ion batteries (about 50 cells) to produce about 129.5 Wh, with each cell having a rechargeable capacity of about 4.1 volt/2500 mAh, a 24 volt output port and an RS-485 (two wire) communication port. The battery pack 120 is secured to the cart 20, 45 via a mounting bracket assembly 125 that includes a support bracket 126 with a slide bar 127. The slide bar 127 allows the battery pack 120 to be quickly removed for recharging and allows a fully charged battery pack to be quickly secured.

The RCP circuitry 109 includes a backup power circuit 130 on the digital board 105 as shown in FIG. 5B. When the RCP 40 is turned on, power from the battery 120 is supplied to the encoders 98 and 99 via a normal encoder power line 131, and is supplied to the microcontroller or MCU 106 and its memory or DRAM 107 via a normal microcontroller power line 132. When battery 120 power is turned off or otherwise disrupted, the backup circuit 130 supplies electric backup power to the encoders 98 and 99, MCU 106 and DRAM 107. The backup power circuit 130 has a backup power source 135, such as a super capacitor. Electric power from the super capacitor 135 is supplied to the encoders 98 and 99 via an encoder backup line 136, and is supplied to the microcontroller 106 via an microcontroller backup line 137. The backup power lines 136 and 137 are electrically connected to the super capacitor and the normal power lines 131 and 132, respectively. Diodes 138 and 139 in the normal power lines 131 and 132 prevent power from the super capacitor 135 from flowing to the battery 120. Then, when the battery 120 power to the RCP 40 is turned back on, power from the battery 120 flows through the diodes 138 and 139 and backup lines 136 and 137 to recharge the super capacitor 135. The super capacitor 135 holds sufficient power to operate the encoders 98 and 99, MCU 106 and DRAM 107 for about one week. The super capacitor 135 is preferably an SCCY83B507SLBLE by AVX corporation.

The autonomous cart 45 includes a time-of-flight laser scanner 140 as shown in FIGS. 2-4, 8-9 and 12. As discussed below, the laser scanner 140 creates constantly updated mapping data or a high-resolution image map 260' (FIG. 14) of the surrounding work environment 260 (FIG. 13) for navigation and avoidance of fixed structures (such as walls, posts, support columns and staircases) and more permanent obstacles (such as furniture, workbenches and shelving units). Although the scanner 140 also detects temporary obstacles (such as workers walking by or packages temporarily placed on the floor), the processor 102 deletes these temporary obstacles from its environmental mapping data stored in its long-term memory 103.

Figure 13:
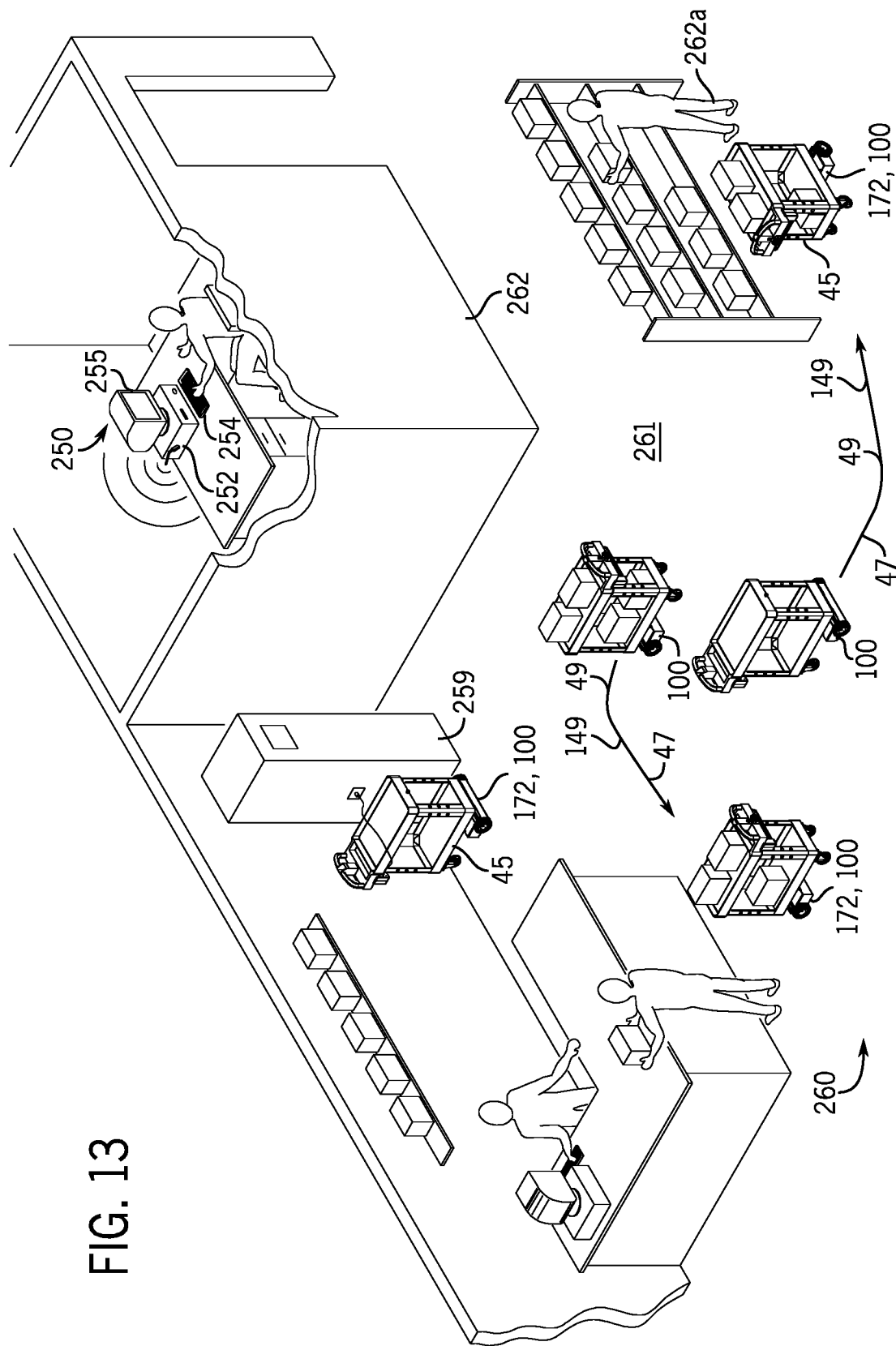
FIG. 13 is an overhead view of a building showing the working environment inside a building with open areas and fixed structures, workers and a computer work station for monitoring and remotely controlling multiple autonomous RCP carts located at or moving between multiple desired destinations throughout the building, including a battery recharging station.
Figure 14:
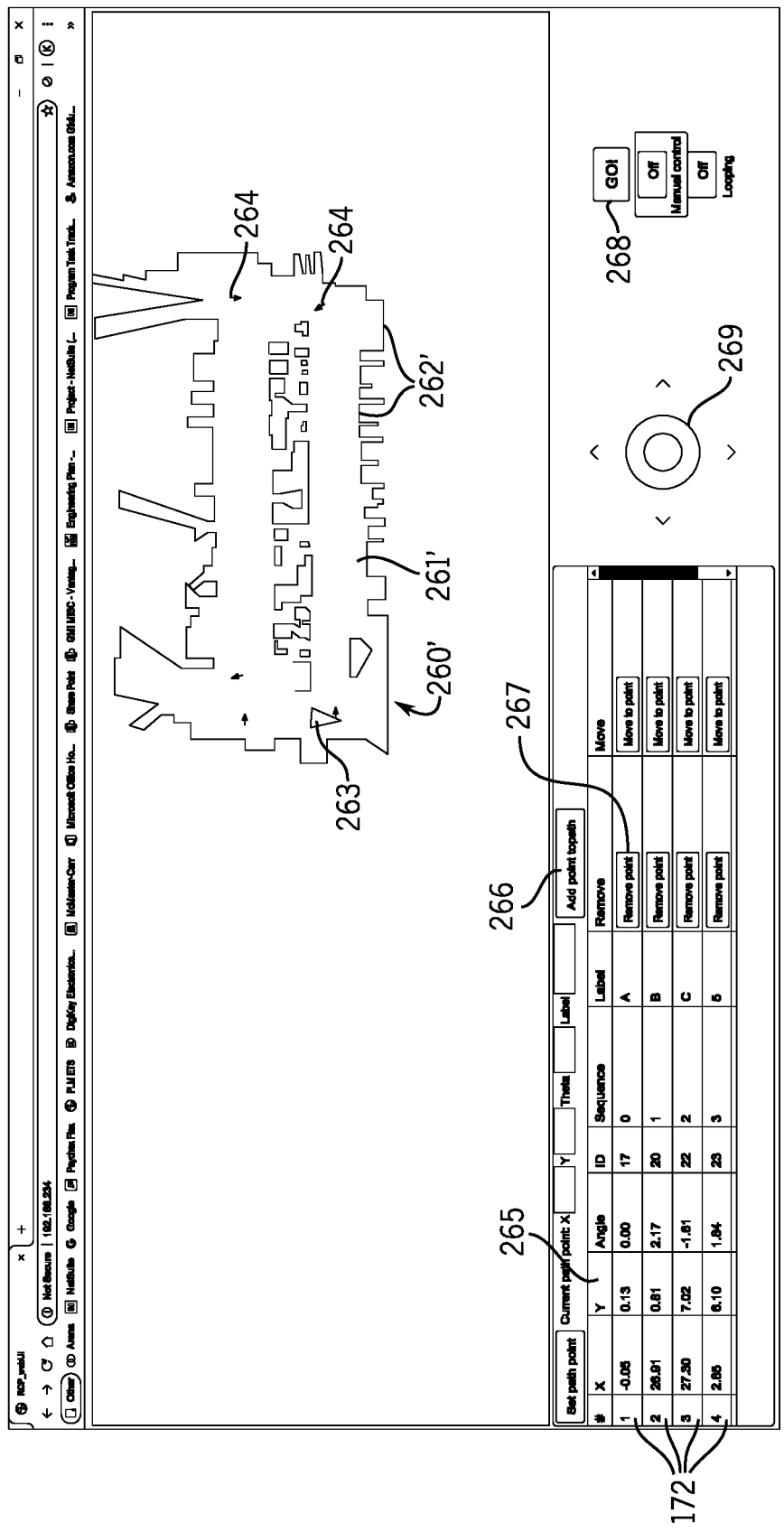
FIG. 14 is a view of a computer screen on an off-board computer showing a map of the working environment of a building obtained by the LIDAR sensor including a triangular symbol designating the current location of the autonomous cart and arrows designating destination locations for the autonomous cart, a chart displaying four destination coordinates and "Move to point" buttons, a joy stick to remotely control the autonomous cart, a GO button to send the cart to its next destination, a joy stick on/off button to turn the joy stick controls on and off, and a cart looping on/off button to turn a cart looping function on and off.

The laser scanner 140 is preferably a triangulation type laser scanner such as a LIDAR (light detection and ranging) sensor with 2D imaging, three hundred and sixty degree (360°) omnidirectional laser range, scanning range of about 12 meters, power input of about 5 volts, sample rate of about 8,000, configurable scan rate from about 2 to 10 hertz, breakout of about 940 nm and is plug-and-play, such as an RPLIDAR A2 by Slamtec. The RCP 40 uses the LIDAR scanner 140 to obtain environmental mapping data that is stored in its memory 103. The RCP 40 uses this mapping data to identify open areas 261 in the building through which the RCP 40 and cart 45 can travel, and to identify fixed structures 262 in the building through which it cannot travel. The RCP 40 uses the mapping data and current location 100 data to determine a route 149 along which the cart 45 can travel to a selected destination 172 as discussed below. (FIGS. 13 and 14). The RCP 40 also uses the LIDAR scanner 140 to detect obstacles as it is en route to a destination.

The LIDAR scanner 140 is preferably mounted on the RCP drive unit 50 below the cart structure 3 and lower tray 21, 31. The scanner 140 is secured to the autonomous cart 45 at a location providing a substantially unobstructed 360° view of the environment 260 around the cart, is protected from inadvertent contact by workers and objects, and does not interfere with the operation of the cart or workers. A particularly good location for the 360° scanner 140 is in the middle of the top surface 54 of the drive unit housing 51, although other locations on the RCP drive unit 50 or cart 45 are possible. The rotating scanner (not shown) of the LIDAR scanner 140 is located above the drive unit mounting bracket 62, so the bracket does not obstruct the view of the scanner. Only the drive unit mounts 65 and a small portion of the rear caster wheel assemblies 14 obstruct the 360° scanning area or plane 142 of the LIDAR scanner 140 as shown in FIG. 10. In this mounting location, the LIDAR scanner 140 views a working range of greater than about 340° of the surrounding environment. The forward viewing area 144 in front of the cart 45 is virtually unobstructed through about 180° and is completely open and unobstructed through about 90°. The rearward viewing area 145 to the rear of the cart 45 is virtually unobstructed through about 180° and is completely open and unobstructed through about 35°. As the LIDAR scanner 140 is mounted directly to the drive unit housing 51 via a mounting bracket 146, its electrical power and communication wires 148 pass through an opening in the top 54 of the housing 51 (FIG. 4), and are directly connected to designated LIDAR connections in drive unit circuitry 109 as discussed above.

Proximity sensors 150 are mounted on the autonomous cart 45 shown in FIGS. 2-3, 6-10 and 12. These sensors 150 allow the autonomous cart 45 to detect, and when necessary navigate around, fixed and temporary obstacles. The proximity sensors 150 are a type of time-of-flight distance sensor or ranging system integrated into a compact module. The sensors 150 are preferably a laser ranging system with a maximum sensing range of about four meters, working voltage of about 2.6 volts to 5.5 volts, supply current of about 15 milliamps, eye-safe 940 nm invisible emitter, programmable region of interest (ROI), field or view (FoV) or scanning cone of 27 degrees, configurable detection interrupts and dimensions of about 0.5×0.7×0.1 inches. As shown in FIG. 8-10, each sensor 150 is pointed in a particular aimed direction 151 and has a 27° sensing cone 152 extending from the sensor for a range of about four meters. Each sensor 150 independently detects the presence of objects within its range and scanning cone 152. Each sensor 150 has a terminal for receiving electric power and sending or receiving communication signals from the microprocessor 106 or drive unit circuitry 109, and is secured inside the riser opening 27 by a mounting clip.

Multiple proximity sensors 150 are mounted to the autonomous cart 45 as shown in FIG. 6-10. Together these sensors 150 provide a substantially unobstructed view of the environment around the cart, particularly in the forward 47 and rearward 48 directions of travel, as well as outward from the sides 2c of the cart 45. The RCP 40 uses the proximity sensors 150 to detect obstacles when it is en route to a destination, and the microcontroller 106 can determine which of the sensors 150 was triggered by an obstacle. The sensors 150 are placed at locations that protect them from inadvertent contact by workers and objects and do not interfere with the operation of the cart or workers. For the plastic autonomous cart 20, 45 the proximity sensors 150 are mounted inside the riser channel 26, with each sensor peering from or out of riser openings 27. Four proximity sensors 150 are mounted in each L-shaped riser 25. One sensor 150 is mounted to peer from the top opening on each side 25a and 25b of each of the four risers 25, and one sensor 150 is mounted to peer from the bottom opening on each side of the risers, as best shown in FIGS. 8-10. Each riser 25 has two proximity sensors 150 pointing sideward 2c, and two proximity sensors pointing forward 2a or rearward 2b. The top sensors 150 are aimed 151 downward at an angle of about thirty degrees (30°), and the bottom sensors are aimed upward at an angle of about thirty degrees (30°), so that their scanning cones 152 start to overlap 154 about half way up the height of the cart 45.

For the metal autonomous cart 30, 45 (FIG. 12), the proximity sensors 150 are mounted to the outside of the lip 7 of the upper tray 32. Two proximity sensors 150 are mounted along each side of the tray 32. Two sensors are directed outwardly or forwardly from the front side 2a of the cart 30. Two sensors are directed rearwardly from the rear side 2b of the cart 30, and two sensor are directed sidewardly from each side 2c of the cart. No matter which direction the autonomous cart 20, 30, 45 is traveling, forward 47, rearward 48 or turning to the right or left 49, the cart has two proximity sensor 150 facing in that general direction.

Warning or safety lights 160 are mounted to and around the autonomous cart 45. For the plastic autonomous cart 20, 45 the lights 160 are mounted inside the riser channel 26, with each light peering from or out of a riser opening 27. Two safety lights 160 are mounted in each L-shaped riser 25. One light 160 is mounted to peer from the middle opening 27 on each side 25a and 25b of each of the four risers 25. Each riser 25 has one light 160 facing sideward 2c, and one light facing forward 2a or rearward 2b. The lights 160 are preferably LED lights that consume a minimal amount of electric power. The LED lights 160 slowly blink on and off when the cart is moving, and change color (orange) and do not blink when and obstruction is detected. Different colors can flag different situations such as purple—proximity sensor not working, white—cart is moving in that direction (headlights), red—cart is moving away (taillights) and green—all actions completed and cart is ready for another command. Each light 160 has a connection terminal for receiving electric power, and is secured inside the riser openings 27 by a mounting clip 165.

A control panel 170 or suitable device to allow a worker to communicate with the navigation and movement system 42 is mounted on the autonomous cart 45. The panel 170 is mounted at a location that provides easy access by a worker, such as on or near the cart handle 12. The communication device 170 is preferably a 6-key input device with customizable LCD keys 171 and a microprocessor with nonpermanent rapid access memory, and is capable of displaying custom icons and animated gifs, such as the Eltato Stream Deck Mini pad by Corsair. Each key 171 has a surface that is touched or pressed to operate the key, although other activation mechanisms to physically operate the key are possible. Each key also has a tap-to-switch scene to launch various custom programmed capabilities.

Figure 15A:
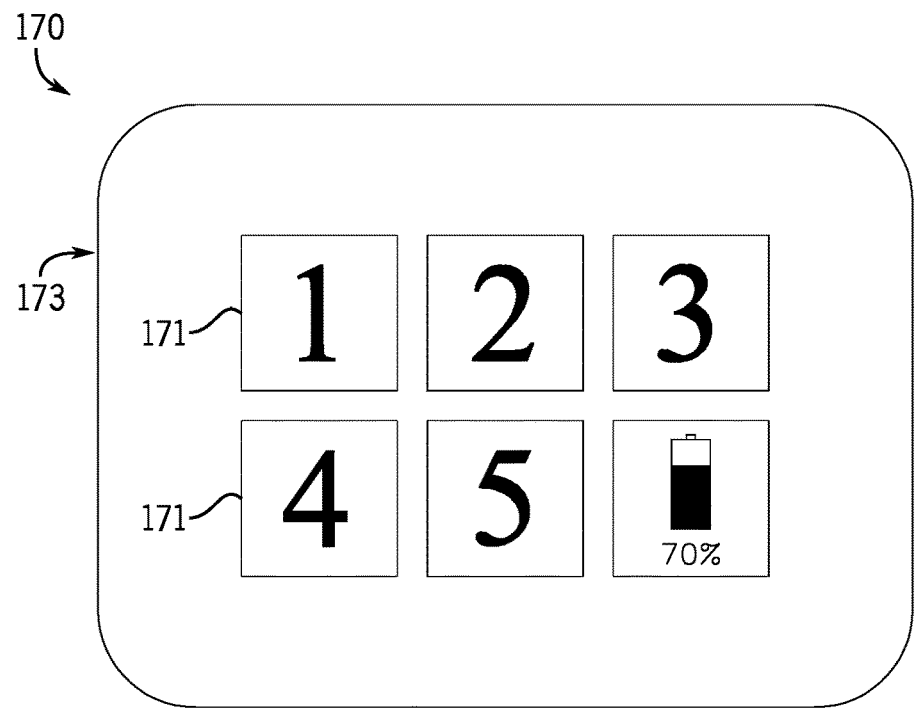
FIG. 15A shows a view of the 6-key control panel with five keys displaying destination icons and a sixth key displaying a battery charge level icon
Figure 15B:
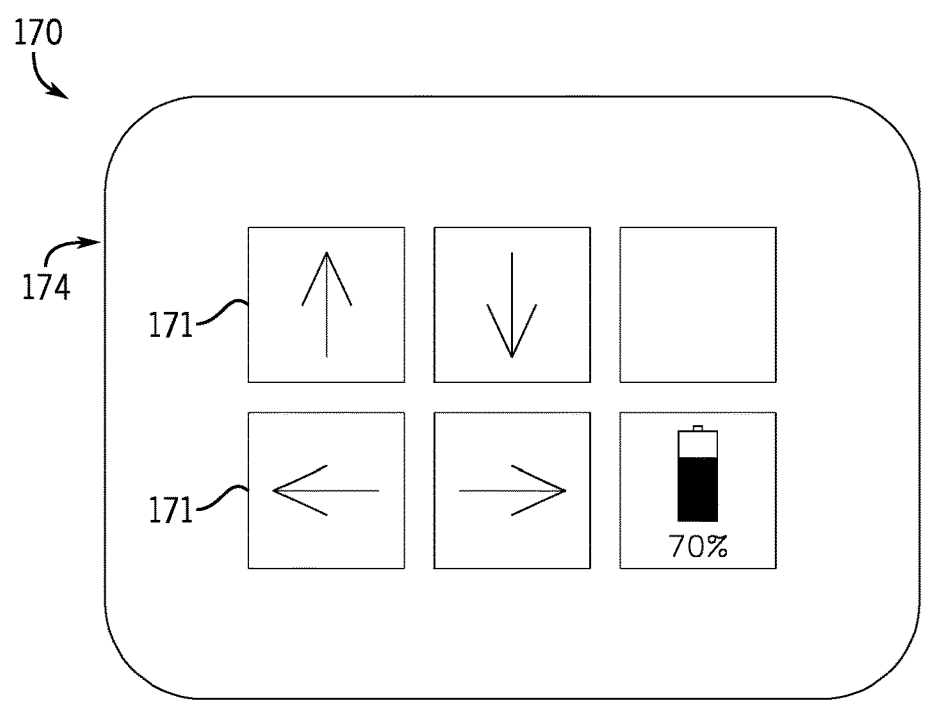
FIG. 15B shows a view of the 6-key control panel with four keys displaying arrow icons, a fifth key displaying the battery charge level icon and the sixth key blank.

The communication device or control panel 170 is preferably secured to the rear side 2b of the utility tray 28 by a mounting bracket and fasteners. The panel 170 has a connection that receives a USB cable to provide electric power from the battery as well as send and receive signals, or otherwise communicate with the navigation and movement systems 42, processor 102 and memory 103. The RCP memory 103 is loaded with sets of icons 173 and 174 to selectively display on the six control keys 171. One set of icons 173 or 174 is displayed at a time on the keys. (FIGS. 15A and 15B). By pressing, touching or otherwise physically engaging or activating a designated key, such as the bottom right key displaying battery charge level information and a "battery charge level" icon), the control pad 170 switches between displaying the first 173 and second 174 set of icon images. One set of icon images 173 or 174 is displayed at a time. When a key 171 is pressed displaying a particular icon image, the control panel 170 sends a recognized instruction signal or command associated with that icon image to the RCP processor 102, which then uses the navigation and control system 42 to perform the particular navigation and movement operations necessary to complete that command.

The 6-key control panel 170 allows the navigation and movement system 42 to perform a wide range of functions. When the RCP 40 is turned on, the RCP processor 102 displays the set of destination icons 173 on the keys 171 as shown in FIG. 15A. The workers use this set of destination icons 173 (e.g. icon "1," "2," "3," etc.) to enter multiple distinct desired destination locations 172 into the RCP memory 103. Once the cart 45 is positioned at a desired destination 172, the worker presses and holds one of the keys 171 displaying a destination icon 173 (e.g., icon "1") for more than a predetermined threshold period of time, such as more than three seconds. The RCP processor 102 then uses RCP movement data such as drive shaft rotation data obtained from encoders 98 and 99 to determine the current physical location 100 and associated coordinates or coordinate data of the cart 45, and saves the coordinate data for this location in the RCP memory 103 as the desired or selected destination 172 associated with that particular key 171 and its associated icon image 173 ("1" icon). The background color of the destination key 172 will change from an unset color (gray) to a set color (green). This provides a visual indication to the workers that the desired destination 172 has been successfully set and stored in the RCP memory 103. Now, when the key 171 with this destination icon ("1" icon) is subsequently pressed for less the threshold period of time (less than three seconds), the cart 45 will go to that previously set and stored destination location 172. Each key 171 with a particular destination icon ("1-5") is used to set and then later select a particular desired destination 172 associated with that icon.

The autonomous cart 45 is programmable to stop when it gets to a desired destination 172 and wait for a worker to enter further control panel instructions, or move in a looped manner from one predetermined destination location 172 to another. For the later, once the cart 45 reaches a first desired destination 172 ("1" icon) and waits a predetermined period of time, the cart 45 goes to the next numerical predetermined destination 172 ("2" icon). Workers can change the order of the loop by resetting the particular destination 172 associated with each destination icon. Workers can delete a predetermined destination 172, and if desired replace it with another destination location 172 as noted above.

The set of arrow or movement icons 174 (FIG. 15B) allows workers to use the RCP drive motors 91 and 92 to move the cart 45 in a self propelled manner as they walk behind the cart. When a key 171 with an arrow icon 174 (e.g., "i" icon) is pressed, the cart 45 moves under its own power in the direction of the arrow until the worker stops pressing the key with that arrow icon. Destinations can be set by manually pushing the cart 45 or by using the keys 171 with the arrow icons to move the cart to a desired destination. Given backup circuit 130 and "always on encoders" 98 and 99, the cart 45 can be turned off and manually pushed to a location to be set as a destination. The RCP 40 uses its encoders 98 and 99 and drive shaft rotation data to determine the current, real-time location 100 of the cart 45 when a key 171 displaying a destination icon 173 (e.g., "1" icon) is pressed. To set a desired destination 172, the autonomous cart 45 and communication device 170 needs to be powered on. The 6-key control pad 170 does not function when the cart 45 is not powered on.

A large visible on/off switch 175 is provided on or near the control panel 170. This switch or depressible button 175 is used to turn on or activate the RCP drive unit 50 by allowing electric power from the battery 120 to energize the internal and external RCP drive unit 50 components and devices that form the RCP 40, and place the RCP 40, navigation and movement system 42 and cart 45 in an autonomous mode of operation. The switch 175 is also used to turn off or deactivate the RCP 40 by disconnecting the flow of electric power from the battery 120 to the RCP, and place it and cart 45 in a manual mode of operation. The switch 175 is mounted through a hole drilled into the cart 20 and secured by a nut on the back side. Two wires on the back of the button 175 provide its electrical connection with the system circuitry 109. An emergency stop button 180 is located at the front 2a of the cart 45. This button 180 can also be used by a worker to turn off or deactivate the RCP 40, and place it and the cart 45 in a manual mode of operation. The button 180 has a rear connection 182 for receiving a USB cable to send and receive communication signals.

The control panel 170 has a "GO" button 185. For the plastic cart 20, 45 (FIG. 6), the 6-key control panel 170 is programmed to have one of its keys serve as the GO button. For the metal cart 30, 45 (FIG. 12), the GO button 185 is located on the control panel 170. The "GO" button is a momentary switch that is pressed to signal to the RCP processor 102 that it should instruct the RCP drive unit 50 to move. When the "GO" button 185 is pressed, the cart 45 will autonomously move to the next predetermined destination 172 selected by the worker or on the organized list of destinations 265 stored in the RCP memory 103, as discussed below. (FIG. 14). The cart 45 autonomously moves to the list of predetermined destinations in a loop, and then repeats that movement cycle. When the "GO" button 185 is pressed, the RCP 40 uses its navigation and movement system 42 to plan a route 149 to the selected destination or next destination on its list of destinations, and then moves along that route to the designation. When more than one destination is entered, set or otherwise downloaded into the RCP memory 103, the RCP 40 will move from destination to destination in a round loop each time the "GO" button is pressed. The RCP drive unit 50 and cart 45 stop once the RCP drive unit reaches the next destination. The control panel 170, switch 175, and emergency stop and GO buttons 180 and 185 are used by workers standing next to the cart 45, but can be remotely controlled by an optional server and wireless communication system as discussed below.

The RCP 40 is equipped with an audio speaker 190 for communicating with workers. For a plastic cart 20, 45, the speaker 190 is secured in a webbing compartment 24 on the underside of the upper tray 22 as shown in FIG. 7. A speaker mount 194 is provided to secure the speaker in place. The speaker 190 is electrically connected by a USB cable for power and communication to the RCP 40 and its processor 102 via the circuitry 109 and an input/output terminal of the RCP drive unit 51. The processor 102 is programmed to send one of several audio messages stored in its memory 103 to the speaker 190 for a variety of reasons. For example, these reasons include when the proximity sensors 150 detect a moving object 262a (such as a person) in the vicinity, the weight sensors 80 detect a load in excess of the capacity of the cart 45, the weight sensors 80 detect an unbalanced load, the battery pack 120 is running low or needs recharging or a worker enters invalid destination coordinates into the key pad 170. The audible message can be a simple beeping, buzzing or siren sound, or a verbal message (such as "warning load capacity exceeded," "warning unbalanced load," "battery low," "recharge battery" or "invalid destination coordinates"). The message is repeated until a corrective action is detected by the processor 102, the identified moving object (person) moves away or a worker acknowledges the receipt of the message via the key pad 170. The audio speaker 190 has a rear connection terminal for receiving electric power and sending and receiving communication signals.

The RCP 40, navigation and movement system 42 and autonomous cart 45 are optionally equipped with a WiFi unit 195. The WiFi unit 195 is mounted inside a webbing compartment 24 on the upper tray 22, and is in electrically connected via a USB cable for power and communication to the RCP 40 and its processor 102 via the circuitry 109 and input/output terminal 118 of the RCP drive unit 51. The WiFi unit 195 preferably has input power of 5 volts, an operating wavelength of about 2.4 to 5.8 gigahertz, and a transmission range of about 10 meters, such as an B07J65G9DD by Techkey.

A cable array 200 shown in FIG. 2 connects the exterior components of the RCP 40 and navigation and movement system 42 to the input/output terminals 110 of the RCP drive unit 50 circuitry 109. The cabled components include the weight sensors 80, battery 120, proximity sensors 150, safety lights 160, control panel 170, On/Off switch 175, emergency stop 180 button, "GO" button 185, audio speakers 190 and Wi Fi unit 195. As noted above, the LIDAR sensor 140 mounted atop the drive unit 50 can be directly wired to the drive unit circuitry 109 as in FIG. 3 or cabled through an input terminal 119 as in FIG. 5B. The cabled array 200 includes two lines 201 and 202 routed through the cart 20 as shown in FIGS. 2, 8 and 9 to connect the external components with their associated input/output terminals 111-119. One line 201 is routed along the rights side of the cart 20, and one line 202 is routed along the left side of the cart.

The right 201 and left 202 lines each include multiple and separate wire lines 205 for powering and communicating with two weight sensors 80, eight proximity sensors 150 and four safety lights 160. The right line 201 also includes separate wiring lines 205 for powering and communicating with the control panel 170, On/Off switch 175, emergency stop 180 button, "GO" button 185, audio speakers 190 and WiFi unit 195. The individual wires 206 at one end of each power and communication wiring line 205 for a specific external component are connected to a component-specific connection 210 that electrically connect its wires 206 to the terminal for that external component. The individual wires 206 at the other end of each wiring line 205 are connected to an input/output connector 215 that plugs into and electrically connects the wiring line with its appropriate input/output port 111-119 of the drive unit 50. The wiring lines 205 for the proximity sensors 150 in one line 201 or 202 share a common input/output connector 215. The individual wires 205 in the two lines 201 and 202 of the cabled array 200 are harnessed 209 together near the input/output ports 111-119 and joined to their appropriate terminal 215. The appropriate terminals 215 are then plugged into their appropriate input/output port 111-119. It should be understood that the lines of the cabled array 200 can be divided into four line 201-204 as shown in FIG. 3, with one line being routed through the internal channel 26 of each of the four risers 25.

When the RCP 40 is turned on via switch 175, electric power from the battery 120 is supplied to the RCP 40 and navigation and movement system 42, which includes circuit boards and internal components 91, 92, 97-99, 101-109 and 135 as well as external components 80, 140, 150, 160, 170, 175, 180, 185, 190 and 195 via cabled array 200. When the RCP 40 is turned off, electric power from the battery 120 to the RCP 40 and its navigation and movement system 42 are turned off, except for the encoders 91 and 92, MCU 106 and DRAM 107 which remain powered by the backup circuit 130 as discussed above. When the RCP processor 102 detects that the power or charge remaining in the battery 120 is running low or meets a predetermined charge threshold value, the processor plans a route to a recharging station 259 (FIG. 13) and navigate the cart 45 to the recharging station. A worker then connects the battery 120 to a power outlet at recharging station 259 to recharge the battery, or swaps out the battery with an already charged battery at the work station.

Modifications are made to the conventional carts 20, 30 to integrate the RCP 40 and form the autonomous cart 45. The front caster wheel assemblies 14 are removed and replaced with the RCP drive unit 50. For the conventional plastic cart 20, four riser channel cover plates 241 are secured inside each riser 25 to enclose the inner channel 26 and house and protect the proximity sensors 150, lights 160 and cable lines 201 and 202 inside these channels. A tray cover plate 242 is secured to the bottom of the upper tray 22 to house and protect the audio speaker 190, WiFi device 195 inside the webbing chambers 24 of the upper tray, as well as the cable lines 201 and 202 extending through the walls forming it matrix of webbing chambers. Cabling holes 243 are formed in the corners of the flat tray surface 6 of the lower tray 21. A first line of web holes 244 is formed in the structural webbing 23 of the lower tray 21 to route the cables 201 and 202 in a supported manner from the rear of the RCP drive unit 50 to the front of the lower tray, as best shown in FIGS. 8 and 9.

The right and left lines 201 and 202 diverge and passes through a second line of web holes 244 along the front 2a of the lower tray 21 to the front corners of the tray. The lines 201 and 202 pass through their respective holes 243 in the lower tray 21 and extend up their respective riser channel 26. Third and fourth lines of web holes 244 are formed along the sides 2c of the in the upper tray 22 to allow the right and left lines 201 ands 202 to extend in a supported manner along the right and left tray sides to the rear 2b of the tray just above the rear riser channels 26. The lines 201 and 202 extend downward through these channels and pass through the tray holes to reach the two weight sensors 80 at the rear of the cart. Web holes 244 are also formed along the front of the of the upper tray 22 to allow one cable 201 to reach the emergency stop button 180 mounted in an emergency stop button opening 245 formed in the center of the front of the upper tray. Web holes 244 are also formed along the rear of the upper tray 22 to allow a cable line 201 to reach the battery 120, control panel 170, On/Off switch 175 and "Go" button 185, mounted in a GO button opening 249 formed in the center of the utility tray 28. For the conventional metal cart 30 with wire baskets 31-33, riser holes 249 are formed proximal the top and bottom ends of the tubular risers 35 to allow cable wiring to extend from the lower tray to the upper tray in a protected manner.

The RCP 40 uses its WiFi unit 195 to communicate with a separate work station 250 shown in FIG. 13. The conventional work station 250 has a computer processor 252, keyboard input device 254 and monitor 255. The work station processor 252 acts as a server or SRCP for the cart 45. The RCP 40 transmits a variety of data or information to the workstation SRCP 250. For example, environment map data, current or real-time RCP/cart location data and selected desired destination data in the RCP memory 103 is transmitted via the WiFi device 195 to the SRCP 250. The SRCP 250 processes this data for visual display on its monitor 255 as shown in FIG. 14. The monitor 255 visually displays a screen showing an environment map 260' derived from the environmental map data in the RCP 40. The map 260' shows open areas 261' of the building through which the cart 45 can travel, fixed structures 262' in the building, a real-time RCP location marker (triangle) 263 identifying the current physical location 100 of the RCP 40 and listed destination markers (arrows) 264 presently stored in the RCP memory 103.

The computer screen of the monitor 255 also shows a list of the coordinates 265 for each listed destination. The screen provides touch screen buttons 266 and 267 to add destinations to or delete destinations from the RCP memory 103. New destination coordinates are entered via the keyboard 254. The SRCP 250 and its touch screen buttons are operable to remotely select a specific destination for the cart 45 to travel next. Then a visually displayed "GO" button 268 on the screen of the SRCP monitor 255 is pressed to remotely control the RCP 40 and send the cart 45 to that selected destination. The SRCP monitor 255 screen also visually displays a touchable joystick 269 to remotely control the operation of the RCP 40 and movement of the cart 45.

When multiple autonomous carts 45 are used, the SRCP 250 communicates with each of them. Mapping data from various carts 45 is combined to form a global map 260' of the working environment 260 in the SRCP memories 103, which is displayed on the SRCP monitor 255 along with the current locations 100 of each cart. Data containing the master or global map of the SRCP 250 is transmitted to the memory 103 of each RCP cart 45, so that each cart learns from the other carts.

Figure 16B:
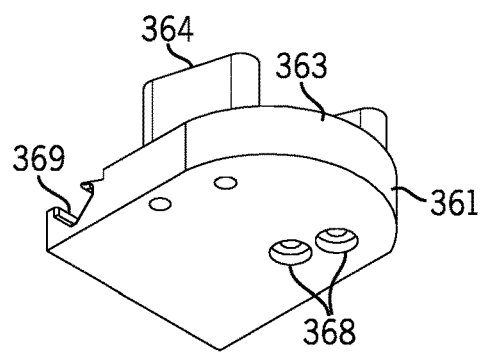

An alternate embodiment of the mounting assembly 60 is shown in FIGS. 16A and 16B. In this embodiment, the mounting assembly 60 takes the form of two mounting blocks 361 and 362 secured to the top 54 of the drive unit housing 50. Each block 361 and 362 has a base portion 363 and two spaced columns 364. The right block 361 is located near the front 52 right 56 corner of the drive unit 50. The left block 362 is located near the front 52 left 57 corner of the drive unit 50. The bottom surface of each block 361 and 362 is flush with the top 54 of the drive unit 50. Each block 361 and 362 is secured to the drive unit 50 by two threaded forward fasteners 365a. These forward fasteners 365a pass through an opening in the top 54 of the housing 51 as well as holes in the base portions 363 and front columns 364 of the blocks 361 and 362, and are received by and secured to threaded holes 367a in its mounting plate 366. The columns 364 open up as much space as possible for the LIDAR scanner so as not to obstruct the LIDAR scanning plane. The rear spacers 61 can also take the form of blocks 361 and 362 with columns 364. As the rear spacers are a further distance from the LIDAR scanner 140, the effect on the scanning plane is less significant.

Each block 361 and 362 also has two rearward fasteners 365b to help secure the mounting plate 366 to its mounting block 361 or 362. The heads of these rearward fasteners 365b are received in recesses 368 in the bottom surface of the blocks 361 and 362. These rearward fasteners 365b also pass through holes in the base portions 363 and rear columns 364 of the blocks 361 and 362, and are received by and secured to threaded holes 367b in its mounting plate 366 to help secure the mounting plates to the drive unit 50. As with mounting assembly 60, threaded fasteners 19 are used to secure the mounting plates 367 to the support structure 8, 8a of the cart 20. These fasteners 19 pass through holes 367c in the mounting plates 366, which are aligned with the fastener holes 8a of the cart mounting structure 8. Again, as with mounting assembly 60, weight sensor assemblies 80 are held between the mounting plates 366 and the cart mounting structure 8. The base portions 363 have a V-shaped groove 369 to secure the right and left cable lines 201 and 202 and keep them from obstructing the view of the LIDAR scanner 140.

While the invention has been described with reference to preferred embodiments, it will be understood by those skilled in the art that various changes may be made and equivalents may be substituted without departing from the broader aspects of the invention.

We claim:

1. An autonomous vehicle for moving through a working environment, said autonomous vehicle comprising:
a movable vehicle structure having at least one rotatable and turnable wheel to move along straight and curved paths of travel;
a platform with first and second drive wheels, said platform being secured to said vehicle structure and said drive wheels being spaced from said turnable wheel, said platform having a navigation and movement system including a first drive motor with a first drive shaft to selectively rotate said first drive wheel and a second drive motor with a second drive shaft to selectively rotate said second drive wheel, a programmed processor with a first memory to plan a route and movement instructions for said platform to travel through the working environment, a programmed microcontroller with a second memory to execute said movement instructions via a motor controller, said motor controller being electrically connected to said drive motors to control rotational movement of said drive shafts and wheels, said motor controller rotating said first drive shaft independently of said second drive shaft to propel said vehicle structure along straight and curved paths of travel, first and second motor encoders obtaining rotational movement data for each of said drive shafts, and circuitry electrically and communicatingly connecting said processor, first memory, microcontroller, second memory, motor controller and encoders;

a main power source in electric power supplying communication with said navigation and movement system via said circuitry, said main power source being secured to one of either said platform and said vehicle structure;

an on/off switch to selectively turn on and turn off said electric power from said main power source to said navigation and moment system, said platform being in an autonomous mode of operation when said switch is turned on and in a manual mode of operation when said switch is turned off, said drive wheels rotating said drive shafts when said platform is in said manual mode of operation, and said platform being at a first location when said switch is turned off;

a backup circuit having a backup power source in electric power supplying communication with said microcontroller, second memory and motor encoders, said backup power source supplying electric backup power to said microcontroller, second memory and encoders when said switch is turned off and said vehicle is in said manual mode of operation; and, wherein said microcontroller, second memory and encoders obtain manual rotational movement data for said first and second drive shafts when said platform is in said manual mode of operation, and said vehicle structure and platform are manually moved from said first location to a second location.

2. The autonomous vehicle of claim 1, and wherein said backup circuit includes a backup encoder power line in electrical communication with a normal encoder power line, and said normal encoder power line includes a first diode preventing backup power from being supplied to said main power source, and wherein said backup circuit includes a backup microcontroller power line in electrical communication with a normal microcontroller power line, and said normal microcontroller power line includes a second diode preventing backup power from being supplied to said main power source.

3. The autonomous vehicle of claim 2, and wherein said backup power source automatically supplies power to said microcontroller, second memory and encoders when said switch is turned off and said platform is in said manual mode of operation.

4. The autonomous vehicle of claim 3, and wherein said main power source is a battery and said backup power source is a super capacitor.

5. The autonomous vehicle of claim 1, and wherein said second location is a current location of said platform, said microcontroller sends manual rotational movement data to said processor when said on/off switch turns on said electric power to said platform, and said processor uses said manual rotational movement data to determine said current location of said platform.

6. The autonomous vehicle of claim 5, and wherein said microcontroller, second memory and encoders obtain autonomous rotational movement data for said first and second drive shafts when said platform is in said autonomous mode of operation, and wherein said processor combines said manual rotational movement data and said autonomous rotational movement data to determine said current location of said platform.

7. The autonomous vehicle of claim 1, and wherein said vehicle structure has a vehicle front end and a vehicle rear end, said at least one turnable wheel is two swiveling wheels secured proximal said vehicle rear end, and said platform is secured below said vehicle structure and said drive wheels are proximal said vehicle front end.

8. The autonomous vehicle of claim 1, and wherein said microcontroller periodically sends said rotational movement data to said processor, said first memory is long-term hard drive memory that retains said rotational movement data when said electric power from said main power supply to said hard drive memory is turned off, and said second memory is short-term dynamic rapid access memory that retains said rotational movement data when said electric power from said main power source supply to said rapid access memory is turned off and said backup power source supply automatically supplies said electric backup power to said rapid access memory.

9. The autonomous vehicle of claim 1, and wherein the vehicle is a utility cart operable by a worker physically next to said utility cart, said vehicle structure is a cart structure, said platform is housed in a drive unit, said drive unit is secured below said cart structure, and the worker physically operates said on/off switch.

10. The autonomous vehicle of claim 1, and wherein each of said drive motors selectively rotates its said drive shaft in one of either a clockwise and counterclockwise direction and propels said platform in one of either a forward direction and a rearward direction.

11. An autonomous utility cart for use by a worker to carry an item through a working environment with open areas and fixed structures, said autonomous utility cart comprising:

a cart structure adapted to carry the item, said cart structure having at least one rotatable and turnable wheel;

a platform with first and second drive wheels, said platform being secured to said vehicle structure and said drive wheels being spaced from said turnable wheel, said platform having a navigation and movement system including a first drive motor with a first drive shaft to selectively rotate said first drive wheel and a second drive motor with a second drive shaft to selectively rotate said second drive wheel, a programmed processor with a processor memory, first and second motor encoders to obtain rotational movement data for each of said drive shafts, circuitry electrically and communicatingly connecting said processor, memory, motors and encoders, said processor sending movement instructions to said drive motors sufficient to independently rotate said first and second drive shafts to propel said cart structure along straight and curved paths of travel, and said processor using said rotational movement data to determine current location data when said platform is at a current location;

a communication device with at least one key to obtain selected destination data when said current location of said platform is at a selected destination, said communication device being in electrical communication with said navigation and movement system and mounted to one of either said cart structure and said platform, and the worker touching said at least one key to store said selected destination data in said processor memory;

a scanning device with a circumferential sensing range to obtain working environment data sufficient to locate the open areas and fixed structures, said scanning device being mounted on one of either said platform and said cart structure and being in electrical communication with said circuitry;

a power source in electric power supplying communication with said circuitry, said communication device and said scanning device, said power source being mounted to one of either said platform and said cart structure; and,
wherein said navigation and movement system uses said working environment data, said selected destination data and said current location data to plan a route and movement instructions for said platform and cart structure to travel through the working environment to said selected destination.

12. The autonomous utility cart of claim 11, and wherein the worker touches said at least one key a subsequent time to instruct said navigation and movement system to send movement instructions to said motors to propel said platform and cart structure along said route to said selected destination.

13. The autonomous utility cart of claim 12, and wherein said at least one key is a first key, said communication device includes at least a second key, said selected destination data is first selected destination data and said selected destination is a first selected destination, the worker touching said second key to obtain second selected destination data when said current location of said platform is at a second selected destination, and wherein when the worker subsequently touches said second key said navigation and movement system uses said working environment data, said second selected destination data and said current location data to plan a second route for said platform and cart structure to travel through the working environment to said second selected destination and instructs said motors to propel said platform and cart structure along said second route to said second selected destination.

14. The autonomous utility cart of claim 13, and wherein said platform automatically travels in a looped manner between said first selected destination and said second selected destination.

15. The autonomous utility cart of claim 12, and wherein said processor memory includes a destination icon and a movement icon, one of either said destination icon and movement icon being selectively displayed on said at least one key, the worker touching said destination icon to autonomously propel said platform and cart structure to said selected destination, and the worker touching said movement icon to move said platform and cart structure in a self-propelled manner.

16. The autonomous utility cart of claim 12, and wherein said navigation and movement system includes a programmed microcontroller with a second memory and a motor controller to execute said movement instructions from said processor, and said circuitry electrically and communicatingly connects said microcontroller and second memory and motor controller.

17. The autonomous utility cart of claim 16, and wherein said platform is located below said cart structure, and said scanning device is a time-of-flight laser scanner mounted atop said platform.

18. The autonomous utility cart of claim 17, and further including a plurality of proximity sensors mounted to said cart structure, each of said proximity sensors obtaining proximity sensor data and being in electrical communication with said circuitry, and wherein the working environment includes temporary obstacles, and said system uses said proximity sensor data to avoid the temporary obstacles when traveling along said route to said selected destination.

19. The autonomous utility cart of claim 18, and wherein said navigation and movement system further uses said environment data from said laser scanner to avoid the temporary obstacles when traveling along said route to said selected destination.

20. The autonomous utility cart of claim 19, and wherein said platform is housed in a drive unit, said time-of-flight laser scanner is mounted to said drive unit and is a light detection and ranging (LIDAR) scanner with a substantially 360° scanning range.

21. A robotic cart platform for integrating into an existing manually operated utility cart to convert the cart into an autonomous utility cart, the cart having a cart structure with a front, rear, first side and second side, lower and upper trays, front and rear risers and front and rear caster wheels, each riser having angled exterior riser walls forming an interior riser channel and having multiple spaced openings extending through the exterior riser walls, the front and rear risers having forward facing openings, rearward facing openings, first side facing openings and second side facing openings, the trays having a top surface supported by structural webbing forming a matrix of tray compartments under the top surface, the cart being used in a working environment including open areas, fixed structures, temporary obstacles and multiple destinations, said robotic cart platform comprising:
first and second drive wheels replacing the front caster wheels of the manually operated utility cart;
a platform located below the lower tray, said platform having a navigation and movement system including a first drive motor with a first drive shaft to selectively rotate said first drive wheel and a second drive motor with a second drive shaft to selectively rotate said second drive wheel, a programmed processor with a first memory to plan a route and movement instructions for said platform to travel through the working environment to a selected destination, a microcontroller with a second memory to execute said movement instructions via a motor controller, said motor controller being electrically connected to said drive motors to control rotational movement of said drive shafts and drive wheels, said motor controller rotating said first drive shaft and first drive wheel independently of said second drive shaft and second drive wheel to propel said platform and cart structure along straight and curved paths of travel, first and second motor encoders obtaining rotational movement data for each of said drive shafts, and circuitry electrically and communicatingly connecting said processor, first memory, microcontroller, second memory, motor controller, drive motors and encoders;
a main power source in electric power supplying communication with said circuitry, said power source being secured to said cart;
a time-of-flight laser scanner with a rotating sensor and a circumferential sensing range to obtain working environment data sufficient to locate the open areas and fixed structures, said laser scanner being secured to one of either said platform and said cart and being in electrical communication with said circuitry;
a plurality of proximity sensors, each said proximity sensor having a sensing direction and being in electrical communication with said circuitry, said proximity sensors being secured in the interior riser channels proximal the riser openings, at least one of said proximity sensors being aimed from at least one of said forward facing openings, at least one of said proximity sensors being aimed from at least one of said rearward facing openings, at least one of said proximity sensors being aimed from at least one of said first side openings, and at least one of said proximity sensors being aimed from at least one of said second side openings;

a cable array including first and second cable lines, said first cable line including a power source cable and first and second proximity sensor cables, said power source cable having opposed terminal connections for electrically connecting to said power source port to said power source, said first proximity sensor cable having opposed terminal connections for electrically connecting said first proximity sensor port to said proximity sensors located on the first side of the cart, said second proximity sensor cable having opposed terminal connections for electrically connecting said second proximity sensor port to said proximity sensors located on the second side of the cart, and said cable array being routed through the interior riser channels and the matrix of tray compartments.

22. The robotic cart platform of claim 21, and wherein said laser scanner is a LIDAR scanner, said LIDAR scanner is located atop said platform and below the lower tray, and each of said proximity sensors has a scanning cone.

23. The robotic cart platform of claim 22, and wherein said navigation and movement system includes a control panel, on/off switch, "GO" button and emergency stop button, each being secured to the cart.

24. The robotic cart platform of claim 21, and wherein said platform is housed in a drive unit, and said drive unit has a mounting assembly with right and left mounting plates, said mounting plates securing said drive unit to the cart mounting structure.

25. The robotic cart platform of claim 21, and wherein said navigation and movement system includes four weight sensors, two of said weight sensor being secured between each of the rear caster wheels and the cart mounting structure, and two of said weight sensors being secured between each of said mounting plates and the cart mounting structure.

26. The utility cart of claim 25, and wherein said first memory includes a weight threshold, said weight sensors send weight data to said processor, said processor compares said weight data to said weight threshold and stops said drive motors when said weight data exceeds said weight threshold.

27. The utility cart of claim 26, and further including a communication device with at least one key to obtain selected destination data when said current location of said platform is at a selected destination, said communication device being in electrical communication with said navigation and movement system and mounted to one or either said cart structure and said platform, and the worker touches said at least one key to store said selected destination data in said processor memory.

28. A utility cart to carry at least one item having an item weight, said utility cart comprising:

a cart structure adapted to carry the item, said cart structure having a cart structure weight and a cart mounting structure, said cart mounting structure having a plurality of spaced apart cart fastener openings extending into said cart mounting structure;

a caster wheel assembly having a wheel mounting bracket with a bracket perimeter portion and an integrally formed bracket central area, said bracket perimeter portion having a plurality of bracket fastener openings in mated alignment with said cart fastener openings;

a weight sensor assembly located between said wheel mounting bracket and said cart mounting structure, said weight sensor assembly including a sensor plate with a sensor plate perimeter portion and an integral inwardly extending semi-flexible cantilevered support tab, said support tab having a tab neck, central focal area, tab surface and a strain gauge sensor, said strain gauge sensor being secured to said tab surface, said tab neck and focal area being surrounded by a flex accommodating opening, and said focal area being aligned directly over and in load supporting engagement with said central area of said wheel mounting bracket;

a weight bearing crown formed on one of either said central area of said wheel mounting bracket and said central focal area of said support tab;

a plurality of fasteners passing through said bracket fastener openings and into said cart fastener openings to firmly secure said caster wheel mounting bracket to said cart mounting structure; said fasteners leaving a non-load bearing gap between said bracket perimeter portion and said sensor plate perimeter portion; and, wherein said semi-flexible support tab flexes responsive to said cart weight and the item weight, and said strain gauge sensor produces strain gauge weight data sufficient to indicate one of either the item weight and said cart weight and the item weight.

29. The utility cart of claim 28, and wherein said weight bearing crown is an upwardly facing curved surface formed into said caster wheel mounting bracket.

30. The utility cart of claim 28, and wherein said weight bearing crown is a downwardly facing curved surface formed into said central focal area of said support tab.

31. The utility cart of claim 28, and wherein said weight sensor assembly includes a spacer plate located between said sensor plate and said cart mounting structure, said spacer plate having a spacer plate perimeter portion and an open spacer plate interior, said support tab flexing upward into said open spacer plate interior.

32. The utility cart of claim 28, and wherein said weight sensor assembly includes a spacer bracket located between said spacer plate and said cart mounting structure, said plurality of fasteners passing through said spacer bracket.

33. The utility cart of claim 32, and wherein said cart has at least three cart mounting structures, said caster wheel assembly is at least three caster wheel assemblies, and said weight sensor assembly is at least three weight sensor assemblies, and wherein each weight sensor assembly is located between an associated wheel mounting bracket and an associated cart mounting structure, said focal area of each support tab being aligned directly over and in load supporting engagement with said weight bearing crown of its said associated wheel mounting bracket, said plurality of fasteners firmly securing each of said caster wheel mounting brackets to its said associated cart mounting structure; and said fasteners leaving a non-load bearing gap between each of said bracket perimeter portions and its said sensor perimeter portion, said support tabs supporting the entire cart structure weight and the entire item weight.

34. The utility cart of claim 33, and further including a programmed processor and a visual display secured to said cart structure, said processor being in electrical communication with said visual display and each of said weight sensors, said weight sensors sending said weight data to said processor, said processor converting said weight data into digital weight measurement data and sending said digital weight measurement data to said visual display, said visual display displaying said digital weight measurement data as a visual weight measurement.

35. The utility cart of claim 34, and wherein said processor has memory containing a weight threshold and a digital warning message, said programmed processor compares said weight threshold to one of either said strain gauge data and said digital weight measurement data, and said processor sends said digital warning message to said visual display when said weight threshold is exceeded, and said visual display displays said digital warning message.

36. The utility cart of claim 35, and wherein said strain gauge sensor is a piezoelectric sensor and said strain gauge data is resistance data.

37. The utility cart of claim 28, and wherein each caster wheel assembly includes a wheel, a wheel axel rotatingly holding said wheel, a hub firmly holding said wheel axel, and said mounting bracket swivelingly holds said hub.

38. The utility cart of claim 28, and wherein said fastener openings are vertical fastener openings and said fasteners are threaded fasteners, and each of said threaded fastener has a narrow shaft and a wide head, said shafts passing through said bracket openings and into said vertical fastener openings in said cart mounting structure, and said wider head of said threaded fasteners engage said wheel mounting plate in a snug, non-weight bearing manner.

* * * * *